United States Patent
Zhang et al.

(10) Patent No.: US 10,921,954 B2
(45) Date of Patent: Feb. 16, 2021

(54) METHOD FOR SHARING CONTENT AND CONTENT SHARING SYSTEM

(71) Applicant: Samsung Electronics Co., Ltd., Suwon-si (KR)

(72) Inventors: Baihui Zhang, Guangzhou (CN); Junwei Liu, Guangzhou (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 15/518,625

(22) PCT Filed: Nov. 11, 2015

(86) PCT No.: PCT/KR2015/012116
§ 371 (c)(1),
(2) Date: Apr. 12, 2017

(87) PCT Pub. No.: WO2016/076627
PCT Pub. Date: May 19, 2016

(65) Prior Publication Data
US 2017/0235444 A1     Aug. 17, 2017

(30) Foreign Application Priority Data

Nov. 12, 2014  (CN) .......................... 201410637551.9
Nov. 11, 2015  (KR) .......................... 10-2015-0158126

(51) Int. Cl.
*G06F 3/0482* (2013.01)
*H04L 12/58* (2006.01)
(Continued)

(52) U.S. Cl.
CPC .......... *G06F 3/0482* (2013.01); *G06F 3/0481* (2013.01); *G06F 16/9577* (2019.01);
(Continued)

(58) Field of Classification Search
CPC .. G06F 3/0482; G06F 16/9577; G06F 3/0481; H04L 51/04; H04L 51/10;
(Continued)

(56) References Cited

U.S. PATENT DOCUMENTS 7,154,535 B2    12/2006  Yamasaki et al.
8,225,197 B1     7/2012  Szewczyk
(Continued)

FOREIGN PATENT DOCUMENTS

CN        1326168 A    12/2001
CN        1398111 A     2/2003
(Continued)

*Primary Examiner* — Jennifer N To
*Assistant Examiner* — Parmanand D Patel
(74) *Attorney, Agent, or Firm* — Jefferson IP Law, LLP

(57) ABSTRACT

A method of sharing content performed by a device includes: receiving a capture image of a screen of another device and reproduction information for reproducing content corresponding to an object displayed on the capture image from the other device; displaying the capture image; and reproducing the content corresponding to the object by using the reproduction information in response to a user input with respect to a region that displays the object in the capture image.

9 Claims, 20 Drawing Sheets

(51) Int. Cl.
  *H04N 1/00* (2006.01)
  *G06F 3/0481* (2013.01)
  *G06F 16/957* (2019.01)

(52) U.S. Cl.
  CPC .............. *H04L 51/04* (2013.01); *H04L 51/10* (2013.01); *H04N 1/00222* (2013.01)

(58) Field of Classification Search
  CPC .......... H04N 1/00222; H04N 1/00352; H04N 1/32144; H04N 1/32229
  See application file for complete search history.

(56) References Cited

U.S. PATENT DOCUMENTS

| | | | |
|---|---|---|---|
| 8,294,787 | B2 | 10/2012 | Hosoda |
| 8,300,784 | B2 | 10/2012 | Choi |
| 8,774,536 | B1* | 7/2014 | Jia .......................... H04L 67/42 |
| | | | 382/232 |
| 9,176,703 | B2 | 11/2015 | Kim et al. |
| 9,241,056 | B2 | 1/2016 | Lonn |
| 2001/0048535 | A1 | 12/2001 | Usami |
| 2002/0145756 | A1* | 10/2002 | Stoecker ............ H04N 1/00241 |
| | | | 358/1.18 |
| 2008/0043108 | A1* | 2/2008 | Jung ...................... H04N 5/772 |
| | | | 348/207.1 |
| 2009/0040324 | A1* | 2/2009 | Nonaka .................. H04N 5/232 |
| | | | 348/220.1 |
| 2010/0199187 | A1 | 8/2010 | Lin et al. |
| 2010/0211865 | A1 | 8/2010 | Fanning et al. |
| 2012/0054691 | A1* | 3/2012 | Nurmi .................... G06Q 10/10 |
| | | | 715/854 |
| 2013/0113876 | A1* | 5/2013 | Zhao ........................ H04N 7/15 |
| | | | 348/38 |
| 2014/0123018 | A1 | 5/2014 | Park |
| 2014/0189576 | A1 | 7/2014 | Carmi |
| 2014/0201640 | A1* | 7/2014 | Lection ............... G06F 3/04817 |
| | | | 715/730 |
| 2014/0337446 | A1 | 11/2014 | Kim |
| 2014/0372540 | A1* | 12/2014 | Libin .................. H04L 12/1822 |
| | | | 709/206 |
| 2015/0058369 | A1 | 2/2015 | Kong et al. |
| 2015/0128017 | A1* | 5/2015 | Fithian .................. G06F 40/134 |
| | | | 715/205 |
| 2015/0205457 | A1* | 7/2015 | Woo ...................... G06F 3/0482 |
| | | | 715/767 |
| 2016/0105318 | A1* | 4/2016 | Bradley ................ G06F 3/1454 |
| | | | 709/217 |

FOREIGN PATENT DOCUMENTS

| | | |
|---|---|---|
| CN | 101316293 A | 12/2008 |
| CN | 101356529 A | 1/2009 |
| CN | 101507245 A | 8/2009 |
| EP | 2 665 244 A1 | 11/2013 |
| KR | 10-2011-0008581 A | 1/2011 |
| KR | 10-2011-0051787 A | 5/2011 |
| KR | 10-2013-0009446 A | 1/2013 |
| KR | 10-2014-0003115 A | 1/2014 |

* cited by examiner

MAPPING TABLE (340)

| REPRODUCTION INFORMATION | COORDINATE INFORMATION CORRESPONDING TO REPRODUCTION INFORMATION |
|---|---|
| IMAGE 1.jpg | (x11, y11), (x12, y12) |
| IMAGE 2.jpg | (x21, y21), (x22, y22) |
| IMAGE 3.jpg | (x31, y31), (x32, y32) |
| IMAGE 4.jpg | (x41, y41), (x42, y42) |
| IMAGE 5.jpg | (x51, y51), (x52, y52) |

FIG. 14

MAPPING TABLE (1340)

| CONTENT IDENTIFICATION INFORMATION (1330) | COORDINATE INFORMATION CORRESPONDING TO CONTENT IDENTIFICATION INFORMATION (1410) |
|---|---|
| FIRST MEMORY ADDRESS INFORMATION (0x10001000) | (x11, y11), (x12, y12) |
| SECOND MEMORY ADDRESS INFORMATION (0x10002000) | (x21, y21), (x22, y22) |
| THIRD MEMORY ADDRESS INFORMATION (0x10003000) | (x31, y31), (x32, y32) |
| FOURTH MEMORY ADDRESS INFORMATION (0x10004000) | (x41, y41), (x42, y42) |
| FIFTH MEMORY ADDRESS INFORMATION (0x10005000) | (x51, y51), (x52, y52) |

METHOD FOR SHARING CONTENT AND CONTENT SHARING SYSTEM

TECHNICAL FIELD

The present disclosure relates to a content share method and a content share system, and more particularly to, a method of transmitting reproduction information for reproducing content to devices included in a content share system and a method of reproducing the content by using the reproduction information.

BACKGROUND ART

As technology related to devices is continuously being developed, an information quantity exchanged between devices is also increasing. For example, various types of files are capable of being transmitted between devices.

Recently, when files are transmitted and received between devices, in the case where it is necessary for a reception device to recognize files to be transmitted from a transmission device, the transmission device transmits a screenshot showing a list of files to be transmitted in advance. Thereafter, the transmission device transmits each of the files included in the list to the reception device. This leads to inefficient information transmission between devices.

DETAILED DESCRIPTION OF THE INVENTION

Technical Problem

Efficient information transmission between devices is provided.

Technical Solution

An embodiment of the present disclosure provides a method of sharing content performed by a device, the method including: receiving a capture image of a screen of another device and reproduction information for reproducing content corresponding to an object displayed on the capture image from the other device; displaying the capture image; and reproducing the content corresponding to the object by using the reproduction information in response to a user input with respect to a region that displays the object in the capture image.

DESCRIPTION OF THE DRAWINGS

FIG. 14 illustrates another example of generating a mapping table in a content share system.

BEST MODE

Figure 1:
FIG. 1 is a schematic diagram of a content share system.

A first aspect of the embodiments provides a method of sharing content performed by a device, the method including: receiving a capture image of a screen of another device and reproduction information for reproducing content corresponding to an object displayed on the capture image from the other device; displaying the capture image; and reproducing the content corresponding to the object by using the reproduction information in response to a user input with respect to a region that displays the object in the capture image.

Also, the other device may transmit and receive a message to and from the device by using a chatting application, and the capture image may be displayed on a chatting window of the chatting application.

Also, the reproducing of the content may include: requesting the other device to send the content corresponding to the object by using the reproduction information; and receiving the content from the other device.

Also, the method may further include: receiving a mapping table including coordinate information of the object included in the capture image and the reproduction information corresponding to the coordinate information.

Also, the method may further include: identifying reproduction information corresponding to coordinate information of a region that displays the object based on the received mapping table, wherein the reproducing may include reproducing the content by using the identified reproduction information.

Also, the reproduction information may be at least one of a content file, identification information of the content file, and link information for downloading the content.

Also, the reproducing may include displaying a graphic user interface (GUI) for storing the content in the device.

Also, the object may be selected by a user of the other device from a plurality of objects included in the capture image, and the object may be emphasized and displayed in the capture image.

A second aspect of the embodiments provides a method of sharing content performed by a device, the method including: generating a capture image in response to a user input for capturing a screen of the device; and transmitting the capture image and reproduction information for reproducing content corresponding to an object displayed on the capture image to another device.

Also, the method may further include: transmitting a mapping table including coordinate information of the object included in the capture image and the reproduction information corresponding to the coordinate information.

Also, the method may further include: receiving a user input that selects the object from a plurality of objects included in the capture image, wherein the object may be emphasized and displayed in the capture image.

A third aspect of the embodiments provides a device including: a communicator configured to receive a capture image that captures a screen of another device and reproduction information for reproducing content corresponding to an object displayed on the capture image from the other device; a display configured to display the capture image; and a controller configured to reproduce the content corresponding to the object by using the reproduction information in response to a user input with respect to a region that displays the object in the capture image.

Also, the other device may transmit and receive a message to and from the device by using the chatting application, and the display may display the capture image on the chatting window of the chatting application.

Also, the communicator may request the other device to send the content corresponding to the object by using the reproduction information in response to the user input and may receive the content from the other device.

Also, the communicator may receive a mapping table including coordinate information of the object included in the capture image and the reproduction information corresponding to the coordinate information.

Also, the controller may identify reproduction information corresponding to coordinate information of a region that displays the object based on the received mapping table and may reproduce the content by using the identified reproduction information.

Also, the display may display a GUI for storing the content in the device.

Also, the object may be selected by a user of the other device from a plurality of objects included in the capture image, and the object may be emphasized and displayed in the capture image.

A fourth aspect of the embodiments provides a device including a controller configured to generate a capture image in response to a user input that captures a screen of the device and a communicator configured to transmit the capture image and reproduction information for reproducing content corresponding to an object displayed on the capture image to another device.

A fifth aspect of the embodiments provides a non-transitory computer-readable recording medium having recorded thereon a computer program for executing the method according to the first and second aspects of the embodiments.

MODE OF THE INVENTION

Hereinafter, terms that are used in the specification will be briefly described, and the present disclosure will be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

While terms "first" and "second" are used to describe various components, it is obvious that the components are not limited to the terms "first" and "second". The terms "first" and "second" are used only to distinguish between each component. For example, a first component may indicate a second component or a second component may indicate a first component without conflicting with the disclosure. As used herein, the term "and/or" includes any and all combinations of one or more of the associated listed items.

Also, when a part "includes" or "comprises" an element, unless there is a particular description contrary thereto, the part can further include other elements, not excluding the other elements. The term 'unit' in the embodiments of the disclosure means a software component or hardware components such as a field-programmable gate array (FPGA) or an application-specific integrated circuit (ASIC), and performs a specific function. However, the term 'unit' is not limited to software or hardware. The 'unit' may be formed so as to be in an addressable storage medium, or may be formed so as to operate one or more processors. Thus, for example, the term 'unit' may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and 'units' may be associated with the smaller number of components and 'units', or may be divided into additional components and 'units'.

The present disclosure will now be described more fully with reference to the accompanying drawings, in which embodiments of the present disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to one of ordinary skill in the art. In the following description, well-known functions or constructions are not described in detail since they would obscure the disclosure with unnecessary detail. Throughout the specification, like reference numerals in the drawings denote like elements.

FIG. 1 is a schematic diagram of a content share system. Referring to FIG. 1, the content share system includes a first device 100 and a second device 200.

The first device 10 and the second device 200 may be computing devices that reproduce a chatting application and transmit and receive messages. For example, the first device 100 and the second device 20 may be smart phones, tablet personal computers (PCs), PCs, smart TVs, cellular phones, personal digital assistants (PDAs), laptop computers, media players, micro servers, global positioning system (GPS) devices, e-book terminals, digital broadcast terminals, navigation devices, kiosks, MP3 players, digital cameras, and other mobile or non-mobile computing devices, but are not limited thereto. Also, the first device 100 and the second device 200 may include various devices such as an electronic board, a touch table, etc. Also, the first device 100 and the second device 200 may be watches, glasses, hair bands, and rings that have a communication function and a data processing function but are not limited thereto. The first device 10 and the second device 200 may include all types of devices that may transmit and receive data over a network.

According to embodiments, the first device 100 may transmit content to the second device 200 while transmitting and receiving messages to and from the second device 200. The first device 100 may capture a screen that displays an object (for example, an icon of a content file, a title, etc.) indicating the content that is to be transmitted. The first device 100 may transmit a capture image and a content file corresponding to objects displayed on the capture image to the second device 200. For example, the first device 100 may capture a screen that displays a file list including content files that are to be transmitted in order to simultaneously transmit a plurality of pieces of content. Thus, a user of the first device 100 may easily transmit the plurality of content files to the second device 200.

Alternatively, the first device 10 may share a web page with the second device 200 while transmitting and receiving messages to and from the second device 200. According to embodiments, the first device 100 may capture an image that displays an object (for example, a reproduction window of a web page, a shortcut icon for accessing a specific web page, etc.) indicating the web page that is to be shared. The first device 100 may transmit a capture image and link information used to download a web page corresponding to objects displayed on the capture image to the second device 200.

The capture image transmitted by the first device 100 may be displayed on a chatting window of a chatting application through which the first device 100 and the second device 200 transmit and receive messages. The second device 200 may receive the capture image through the chatting window and, in response to a user input that selects an object displayed on the capture image, selectively receive and store a content file transmitted by the first device 100.

The network shown in FIG. 1 may include a local area network (LAN), a wide area network (WAN), a value added network (VAN), a mobile radio communication network, a satellite communication network, and a combination of these networks, may be a data communication network, which may be considered in its comprehensive meaning of the network subjects of FIG. 1 being readily able to communicate with each other, and may include wired Internet, wireless Internet, and a mobile wireless communication network.

A method in which the first device 100 transmits a capture image and reproduction information for reproducing content to the second device 200 will be described in detail with reference to FIGS. 2 through 14 below.

Also, although it is assumed that the first device 100 transmits the capture image and the reproduction information for reproducing content to the second device 200, for convenience of description, it will be easily understood by one of ordinary skill in the art according to embodiments that the second device 200 transmits the capture image to the first device 100.

Figure 2:
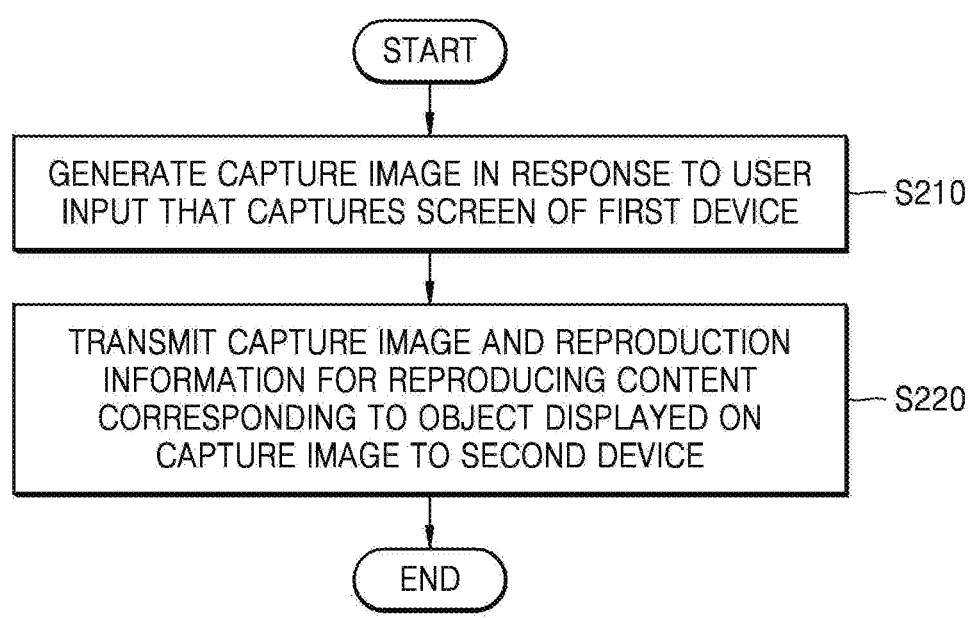
FIG. 2 is a flowchart for explaining a method in which a first device transmits reproduction information for reproducing content to a second device in a content share system, according to an embodiment.

FIG. 2 is a flowchart for explaining a method in which a first device transmits reproduction information for reproducing content to a second device in a content share system, according to an embodiment.

Referring to FIG. 2, in operation S210, the first device 100 may generate a capture image in response to a user input that captures a screen thereof. In this regard, the first device 100 may execute a chatting application and may transmit and receive messages to and from the second device 200 through the chatting application.

Specifically, the first device 100 may reproduce a reproduction screen of a different application, a home screen, or a menu screen in a foreground while transmitting and receiving messages to and from the second device 200 through the chatting application. In this regard, the chatting application may be executed in a background. Also, the different application may be, for example, a photo book application, an address book application, a web server application, a browser application, etc.

A user of the first device 100 may capture the reproduction screen of the different application that displays an object indicating content that may be transmitted to the second device 200 through the chatting application. For example, the first device 100 may receive a user input that captures a reproduction screen of the photo book application that displays an icon of a photo that is to be transmitted to the second device 200. Alternatively, the first device 100 may receive a user input that captures a reproduction screen of the address book application that displays contact information that is to be transmitted to the second device 200. Alternatively, the first device 100 may receive a user input that captures a menu screen that displays an icon of an application that is to be transmitted to the second device 200.

Alternatively, the first device 100 may copy icons indicating a plurality of pieces of content stored in different paths, images, and/or text in a temporary storage and then receive a user input that captures the temporary storage. In this regard, the temporary storage may be a clipboard provided by the chatting application and may be displayed on the screen of the first device 100.

Also, a user input for touching the screen may be a touch input made by a user's finger, a stylus pen, etc. a button input made using a button provided in the first device 100, or a combination of these inputs.

The first device 100 may generate a capture image in response to the user input that captures the screen.

In operation S220, the first device 100 may transmit the capture image and reproduction information for reproducing content corresponding to an object displayed on the capture image to the second device 200. In this regard, the reproduction information may be, for example, a content file of content corresponding to the object displayed on the capture image, identification information of the content file, or link information for downloading the content. Also, the reproduction information may be, for example, identification information of the content but is not limited thereto.

Specifically, the first device 100 may analyze the capture image to identify objects included in the capture image.

Also, the first device 100 may determine whether the identified objects indicate the content. For example, when the object is a text, the first device 100 may search for a content file having the same file name as that of the text. Alternatively, when the object is an image, the first device 100 may search for a content file having the same icon as that of the image. In this regard, the first device 100 may search for a content file stored in the first device 100 or in an external server. If the content file is present in the first device 100, the first device 100 may use the content file as the reproduction information. If the content file is present in the external server, the first device 100 may use link information indicating the content file stored in the external server as the reproduction information.

The first device 100 may generate a transmission file including the capture image and the reproduction information and transmit the transmission file to the second device 200. For example, the first device 100 may generate the transmission file having a multipurpose Internet mail extension HTML (MHTML) file format or an election markup language (EML) file format.

Also, according to embodiments, the first device 100 may generate coordinate information about a predetermined region including at least one object corresponding to the reproduction information from the capture image. For example, when an object corresponds to one piece of reproduction information, the first device 100 may generate coordinate information about a region that displays the object from the capture image. Alternatively, when a plurality of objects correspond to the same reproduction information, the first device 100 may generate coordinate information about a region including the plurality of objects from the capture image. The first device 100 may transmit a mapping table including the coordinate information corresponding to the object and the reproduction information corresponding to the coordinate information to the second device 200. For example, the first device 100 may transmit a transmission file including the capture image, the reproduction information, and the mapping table to the second device 200.

When the reproduction information is the identification information of the content file, the second device 200 may request the first device 100 to send the content by using the identification information of the content file. In this regard, the identification information of the content file may be a title of the content file, address information that stores the content file, etc. In this case, the first device 100 may transmit the content file to the second device 200 if receiving a request from the second device 200.

The first device 100 generates the capture image while executing the chatting application but is not limited thereto. The first device 100 may generate the capture image irrespective of whether it is executing the chatting application. In this case, the first device 100 may use a capture image previously stored in the chatting application. For example, if the first device 100 generates the capture image, the chatting application may be executed.

Alternatively, according to embodiments, the chatting application may provide a graphic user interface (GUI) that may capture a reproduction screen of a different application. In this case, the first device 100 may generate the capture image by using the GUI provided by the chatting application.

Figure 3:
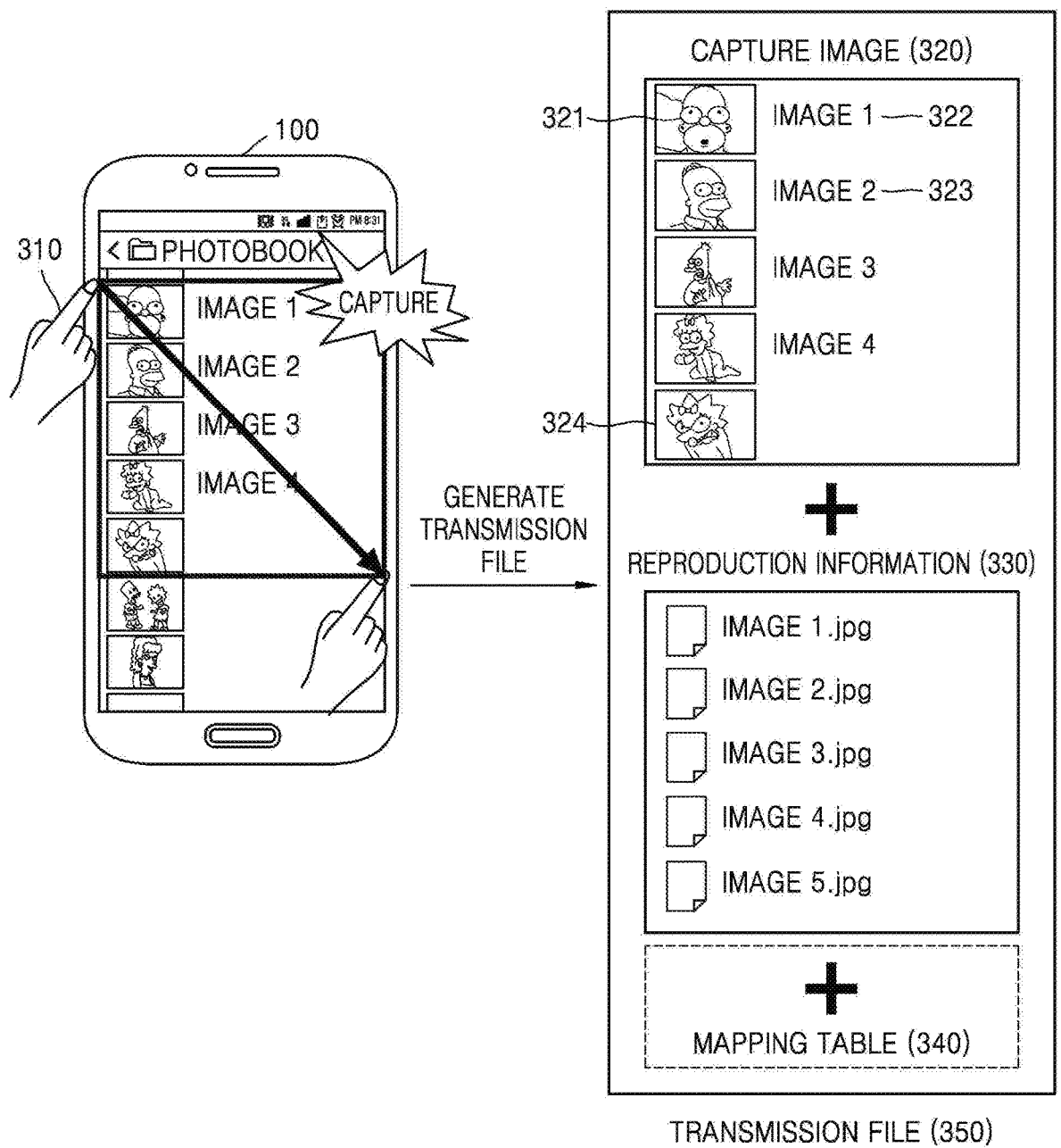
FIG. 3 illustrates an example of generating a transmission file including a capture image and reproduction information in a content share system.

FIG. 3 illustrates an example of generating a transmission file including a capture image and reproduction information in a content share system.

Referring to FIG. 3, since the first device 100 receives a user input 310 that captures wholly or partially a screen thereof, the first device 100 may generate a capture image 320. Also, the first device 100 may obtain reproduction information 330 for reproducing a plurality of pieces of content (i.e. an image 1 through an image 5) corresponding to objects 321, 322, 323, 324, etc. displayed on the capture image 320. For example, the reproduction information 330 may include content files (i.e. image 1.jpg through image 5.jpg) stored in the first device 100.

Also, the first device 100 may generate a transmission file 350 including the capture image 320 and the reproduction information 330. Also, the transmission file 350 may further include a mapping table 340. The mapping table 340 may include coordinate information corresponding to the object 321 displayed on the capture image 320 and the reproduction information 330 corresponding to the coordinate information. A method of generating the mapping table 340 will be described in detail with reference to FIGS. 4 and 5.

Figure 4:
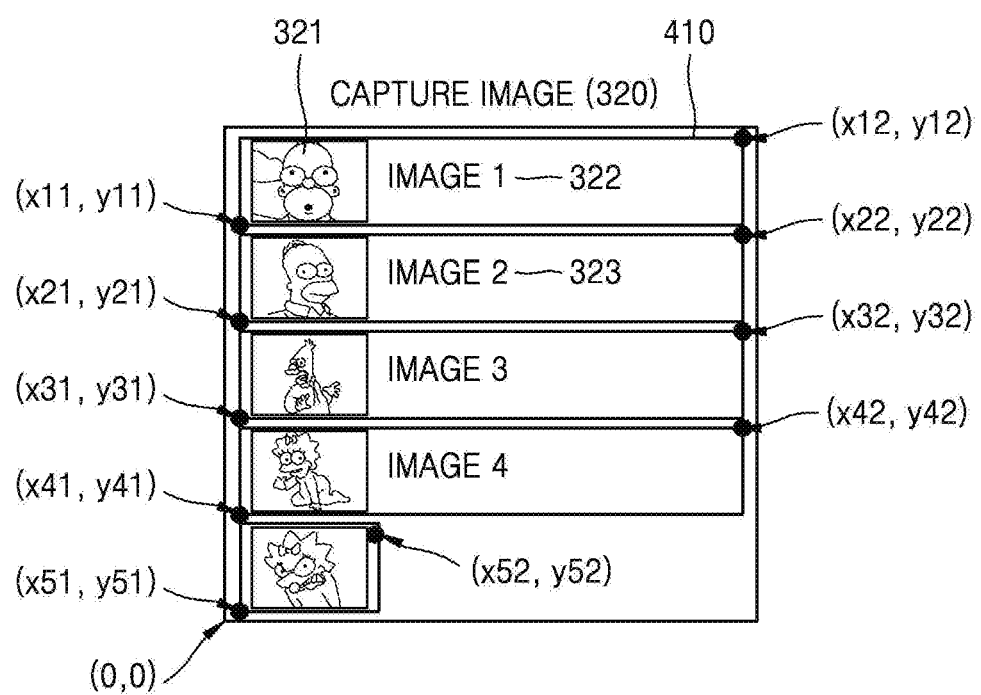
FIG. 4 illustrates an example of generating coordinate information about a predetermined region including at least one object in a capture image.

FIG. 4 illustrates an example of generating coordinate information about a predetermined region including at least one object in a capture image.

Referring to FIG. 4, when the plurality of objects 321 correspond to the same reproduction information (i.e., an image 1), the first device 100 may generate coordinate information about a predetermined region 410 including the plurality of objects 321 and 322. For example, the first device 100 may generate coordinate information (i.e., (x11, y11),(x12,y12)) of both end points of a polygonal direction of the predetermined region 410.

Alternatively, when the object 324 corresponds to one piece of reproduction information (i.e. an image 5), the first device 100 may generate coordinate information (i.e., (x51, y51),(x52,y52)) about a predetermined region 420.

Figures 5, 6:
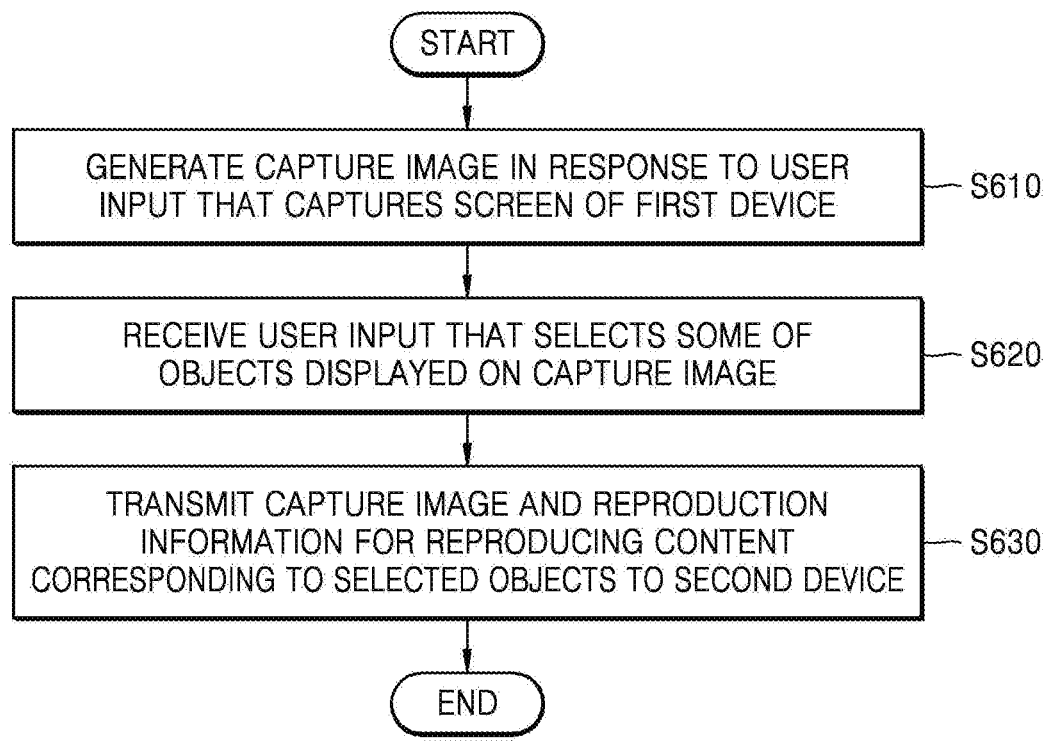
FIG. 5 illustrates an example of generating a mapping table in a content share system.
FIG. 6 is a flowchart for explaining a method in which a first device transmits reproduction information for reproducing content to a second device in a content share system, according to another embodiment.

FIG. 5 illustrates an example of generating a mapping table 340 in a content share system.

Referring to FIG. 5, the first device 100 may generate the mapping table 340 including coordinate information of a predetermined region including at least one object and the mapping table 340 including reproduction information corresponding to the coordinate information. Also, the first device 100 may transmit the mapping table 340 to the second device 200. The second device 200 may reproduce content corresponding to an object displayed on the capture image 320 by using the mapping table 340.

According to embodiments, the mapping table 340 may be generated by the second device 200. In this case, embodiments of FIGS. 4 and 5 may be performed by the second device 200.

FIG. 6 is a flowchart for explaining a method in which the first device 100 transmits reproduction information for reproducing content to the second device 200 in a content share system, according to another embodiment.

Referring to FIG. 6, in operation S610, the first device 100 may generate a capture image in response to a user input that captures a screen thereof. For example, the first device 100 may generate the capture image in response to the user input that captures a reproduction screen of a photo book application, an address book application, a web server application, a browser application, etc., a home screen, or a menu screen, etc.

In operation S620, the first device 100 may receive a user input that selects some of objects displayed on a capture image. For example, the first device 100 may identify the objects included in the capture image by analyzing the capture image. Also, the first device 100 may provide a GUI that selects some of the identified objects. Also, the first device 100 may emphasize and display the objects selected in the capture image. For example, the first device 100 may display the selected objects in a hold line or in a specific color. Alternatively, when another object indicating the same content as the objects selected in the capture image is present, the first device 100 may emphasize and display a predetermined region including different objects indicating the same content.

In operation S630, the first device 100 may transmit the capture image and reproduction information for reproducing the content corresponding to the selected objects to the second device 200. For example, the first device 100 may search for the content corresponding to the selected objects from the first device 100 or an external server and obtain the reproduction information for reproducing the content corresponding to the selected objects.

The first device 100 may generate a transmission file including the capture image and the reproduction information and transmit the transmission file to the second device 200.

Also, the first device 100 may generate the coordinate information about a predetermined region including at least one object selected from the capture image. In this case, the first device 100 may generate a mapping table including the coordinate information about a predetermined region including the selected at least one object and reproduction information corresponding to the coordinate information.

As described above, the first device 100 may selectively transmit the reproduction information for reproducing the content by using the capture image.

Figure 7:
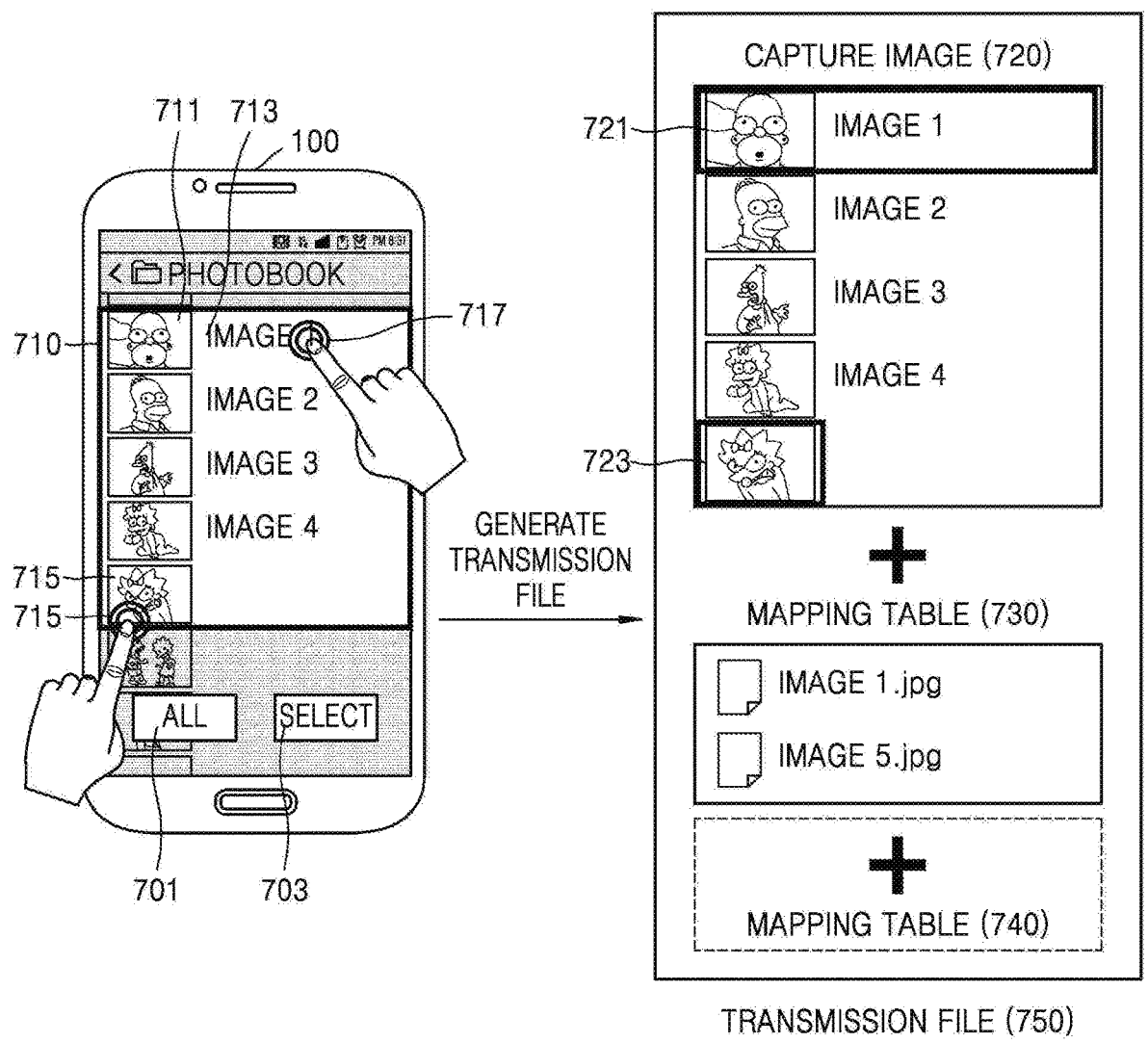
FIG. 7 illustrates another example in which a first device generates a transmission file including a capture image and reproduction information in a content share system.

FIG. 7 illustrates another example in which the first device 100 generates a transmission file 750 including a capture image 720 and reproduction information 730 in a content share system.

Referring to FIG. 7, the first device 100 may provide an 'all' button image 701 that obtains reproduction information for reproducing content corresponding to all objects displayed on a capture region 710 and a 'select' button image 703 that obtains reproduction information for reproducing content corresponding to some of the objects displayed on the capture image 710. If a user of the first device 100 touches the 'all' button image 701, the first device 100 may generate the transmission file 350 of FIG. 3 and transmit the transmission file 350 to the second device 200.

Alternatively, the first device 100 may receive user inputs 717 and 719 that select some objects 713 and 715 among the objects displayed on the capture region 710 and then receive a user input with respect to the select button image 703. In this case, the first device 100 may obtain the reproduction information 730 for reproducing content (for example, an image 1 and an image 5) corresponding to the objects 713 and 715 selected according to user inputs 717 and 719. In this regard, the reproduction information 730 may include content files (for example, an image 1.jpg and an image 5.jpg) stored in the first device 100.

Also, the first device 100 may emphasize and display a first region 723 including the object 715 selected from the capture image 720. Alternatively, when an object 711 indicating content (for example, an image 1) corresponding to the selected object 713 is present in the capture image 720, the first device 100 may emphasize and display a second region 721 including the plurality of objects 711 and 713 indicting the same content. Thus, a user of the second device 200 may easily recognize the objects 711, 713, and 715 corresponding to the reproduction information 730 among the objects displayed on the received capture image 720.

Also, the first device 100 may generate the transmission file 750 including the capture image 720 and the reproduction information 730 and further including a mapping table 740. The mapping table 740 may include coordinate information of first and second regions 721 and 723 including objects selected from the capture image 720 and reproduction information corresponding to the coordinate information.

Figure 8:
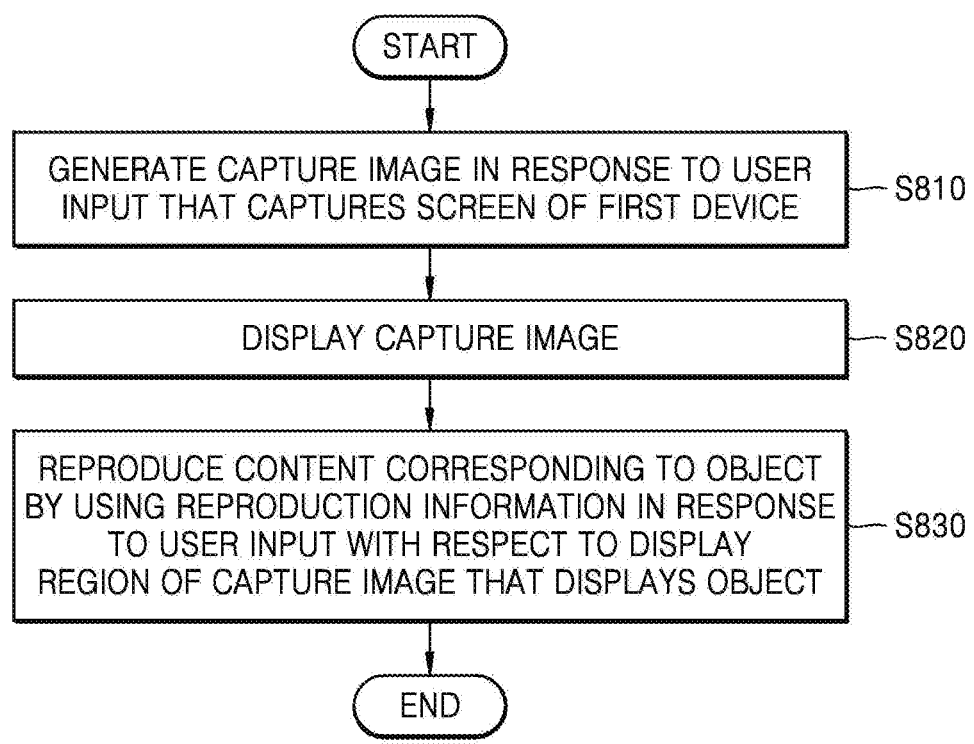
FIG. 8 is a flowchart for explaining a method in which a second device receives reproduction information for reproducing content from a first device in a content share system, according to an embodiment.

FIG. 8 is a flowchart for explaining a method in which the second device 200 receives reproduction information for reproducing content from the first device 100 in a content share system according to an embodiment.

Referring to FIG. 8, in operation S810, the second device 200 may receive a capture image that captures a screen of the first device 100 and reproduction information for reproducing content corresponding to an object displayed on the capture image. In this regard, the second device 200 may be running a chatting application and may be transmitting and receiving messages to and from the first device 100 through the chatting application.

In this regard, the object displayed on the capture image may be an icon indicating content, a text, and/or an image. Also, the content may be text data, audio data, video data and/or application reproduction data (for example, binary data) stored in the first device 100 and may be text data, audio data, video data and/or application reproduction data stored in an external server.

Also, the reproduction information may be, for example, link information used to download a content file of content corresponding to the object displayed on the capture image, identification information of the content file, or the content. For example, the second device 200 may receive the capture image and a content file for reproducing the content corresponding to the object displayed on the capture image. Alternatively, the second device 200 may receive the capture image and link information used to download the content file for reproducing the content corresponding to the object displayed on the capture image. However, the embodiments are not limited thereto. The second device 200 may receive memory address information of the first device 100 that stores the capture image and the content file for reproducing the content corresponding to the object displayed on the capture image. In this case, a method in which the second device 200 reproduces content will be described in detail with reference to FIGS. 12 through 14.

The capture image and the reproduction information may be transmitted in an MHTML file format or an EML file format.

In operation S820, the second device 200 may display the capture image. For example, the second device 200 may display the capture image on a chatting window of the chatting application.

In operation S830, the second device 200 may reproduce the content corresponding to the object by using the reproduction information in response to a user input with respect to a display region of the capture image that displays the object.

For example, the second device 200 may identify the object displayed on the capture image by analyzing the capture image. Also, the second device 200 may receive a touch input from a user's finger on the display region that displays the identified object, or a stylus pen, etc. The second device 200 may identify the object corresponding to the display region in which the touch input is received and may reproduce the content by using the reproduction information corresponding to the object.

Alternatively, the second device 200 may receive a mapping table including coordinate information of a predetermined region including the object included in the capture image and reproduction information corresponding to the coordinate information from the first device 100. In this case, the second device 200 may reproduce the content by using coordinate information of a region in which a user input is received and the coordinate information and the reproduction information of the mapping table. For example, the second device 200 may identify coordinate information of the mapping table that matches coordinate information of a region that displays an object corresponding to the user input and may identify reproduction information corresponding to the coordinate information. In this regard, matching may mean that the coordinate information of the region that displays the object corresponding to the user input is included in or is identical to a region indicated by the coordinate information of the mapping table.

Also, according to embodiments, when the reproduction information is identification information of the content file, the second device 200 may request the first device 100 to send the content file in response to a user input. The second device 200 may reproduce the content by using the content file if receiving the content file from the first device 100.

According to embodiments, the second device 200 may provide a GUI for storing the content in the second device 200 instead of reproducing the content immediately in response to the user input. When a user input to store the content of the second device 200 is selected, the second device 200 may store and reproduce the content in the second device 200. In this regard, a location in which the content is stored may be preset in the second device 200. A GUI for designating the storage location of the content may be further provided.

Figure 9:
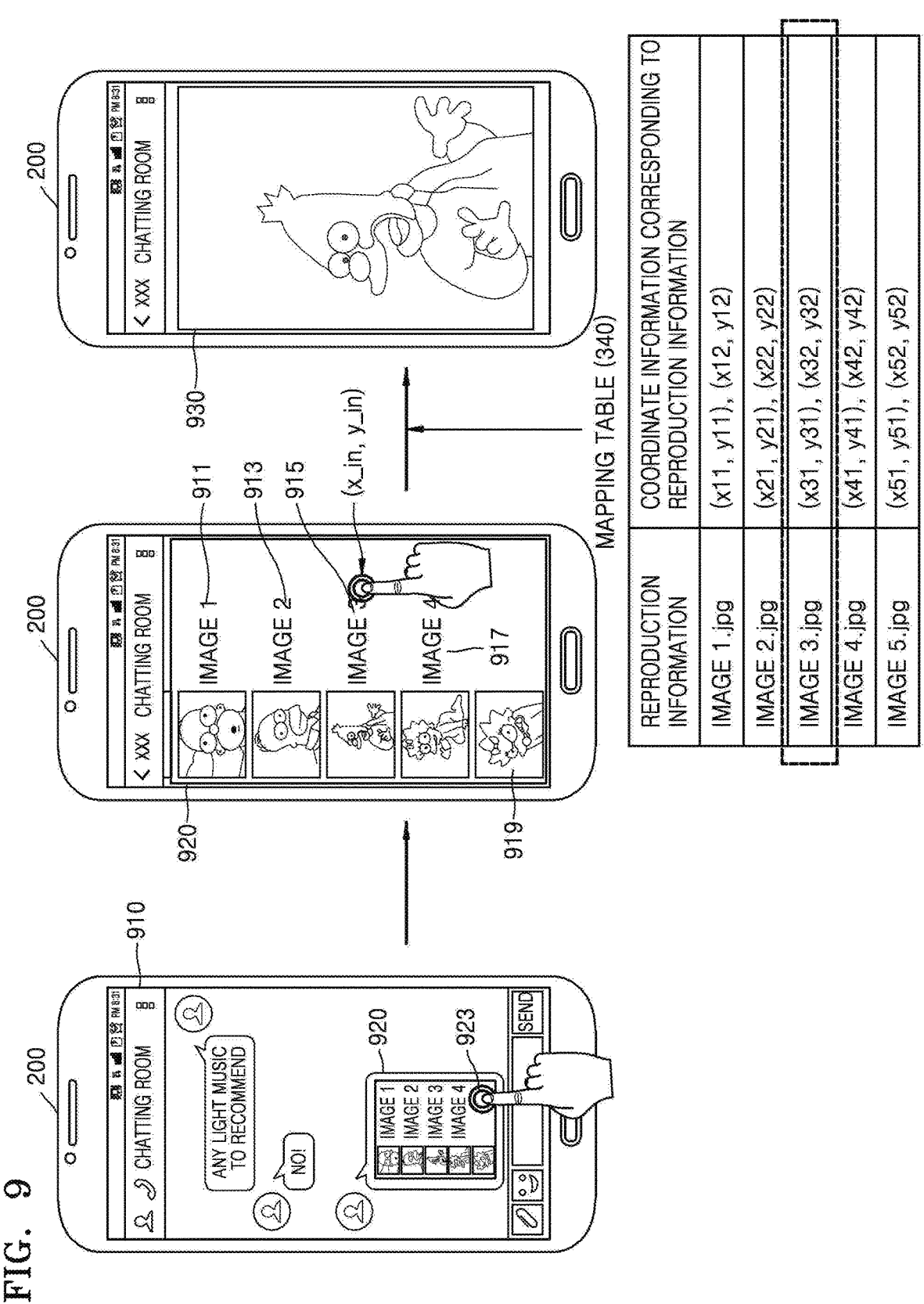
FIG. 9 illustrates an example of reproducing content by using a mapping table of FIG. 5.

FIG. 9 illustrates an example of reproducing content by using the mapping table 340 of FIG. 5.

Referring to FIG. 9, the second device 200 may display a capture image 920 received from the first device 100 on a chatting window 910 of a chatting application. When the capture image 920 is reduced and displayed, the second device 200 may receive a user input 923 that expands the capture image 920.

The second device 20 may receive a user input with respect to an object 915 among objects 911 through 919 displayed on the capture image 920. The second device 200 may identify {(x31, y31), (x32, y32)} as coordinate information that matches coordinate information (x_in, y_in) of a region that displays an object corresponding to the user input 923 in coordinate information of the mapping table 340. Also, the second device 200 may identify an 'image 3.jpg' corresponding to the identified coordinate information {(x31, y31), (x32, y32)} by using the mapping table 340. The second device 200 may compensate for the coordinate information of the mapping table 340 such that the coordinate information matches a coordinate system of the second device 200.

The second device 200 may display image data 930 included in the 'image 3.jpg' by using the identified reproduction information.

As described above, the first device 100 and the second device 200 may share content by using the capture image 920 shared through the chatting window 910. Although the first device 100 and the second device 200 share the content, the embodiment may be applied to a plurality of devices that transmit and receive messages to and from each other through the chatting window 910. In this case, the first device 100 may transmit the capture image 920 and the reproduction information to a plurality of devices.

Figure 10:
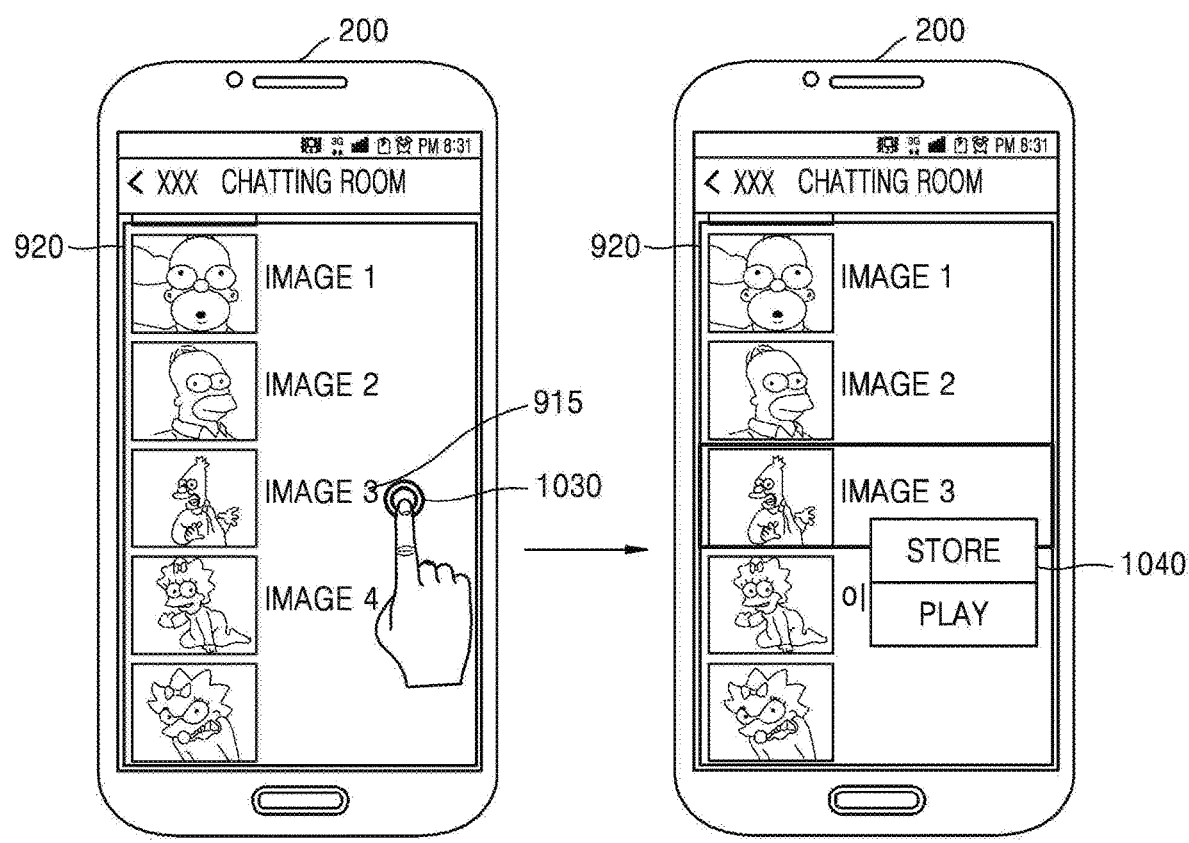
FIG. 10 illustrates an example in which a second device stores content by using reproduction information.

FIG. 10 illustrates an example in which the second device 200 stores content by using reproduction information.

Referring to FIG. 10, if the second device 200 receives a user input 1030 with respect to a region of the capture image 920 that displays the object 915, the second device 200 may provide a GUI 1040 storing content corresponding to the object 915. For example, the GUI 1040 may include a 'store' button image that stores content and a 'play' button image that immediately reproduces the content. Thus, the second device 200 may store and reproduce content obtained by using reproduction information received from the first device 100 or may directly reproduce the content by using the reproduction information in response to a use input with respect to the GUI 1040.

Figure 11:
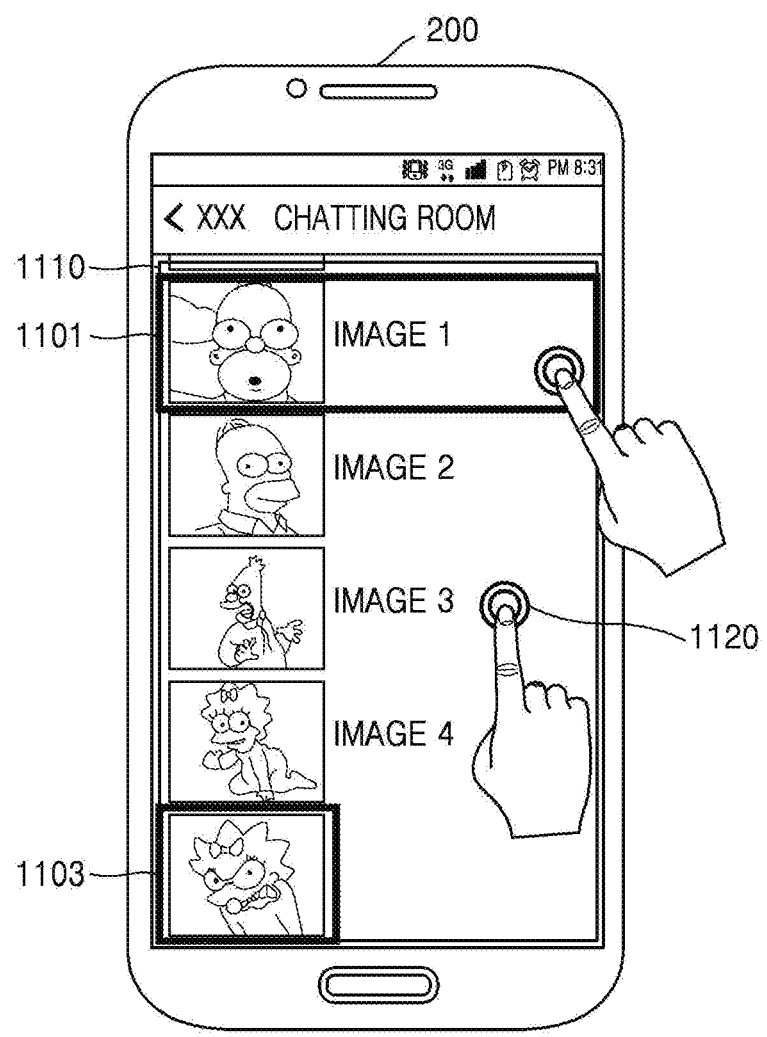
FIG. 11 illustrates an example of a capture image displayed by a second device.

FIG. 11 illustrates an example of a capture image 1110 displayed by the second device 200.

As shown in FIG. 11, the second device 200 may receive the capture image 1110 that emphasizes and displays predetermined regions 1101 and 1103 including some objects. In this case, the second device 200 may reproduce content corresponding to the objects included in the emphasized and displayed predetermined regions 1101 and 1103. If a user of the second device 200 selects a region 1120 including an object of the capture image 1110 that is not emphasized and displayed, the second device 200 may obtain reproduction information for reproducing content corresponding to the selected object.

Figure 12:
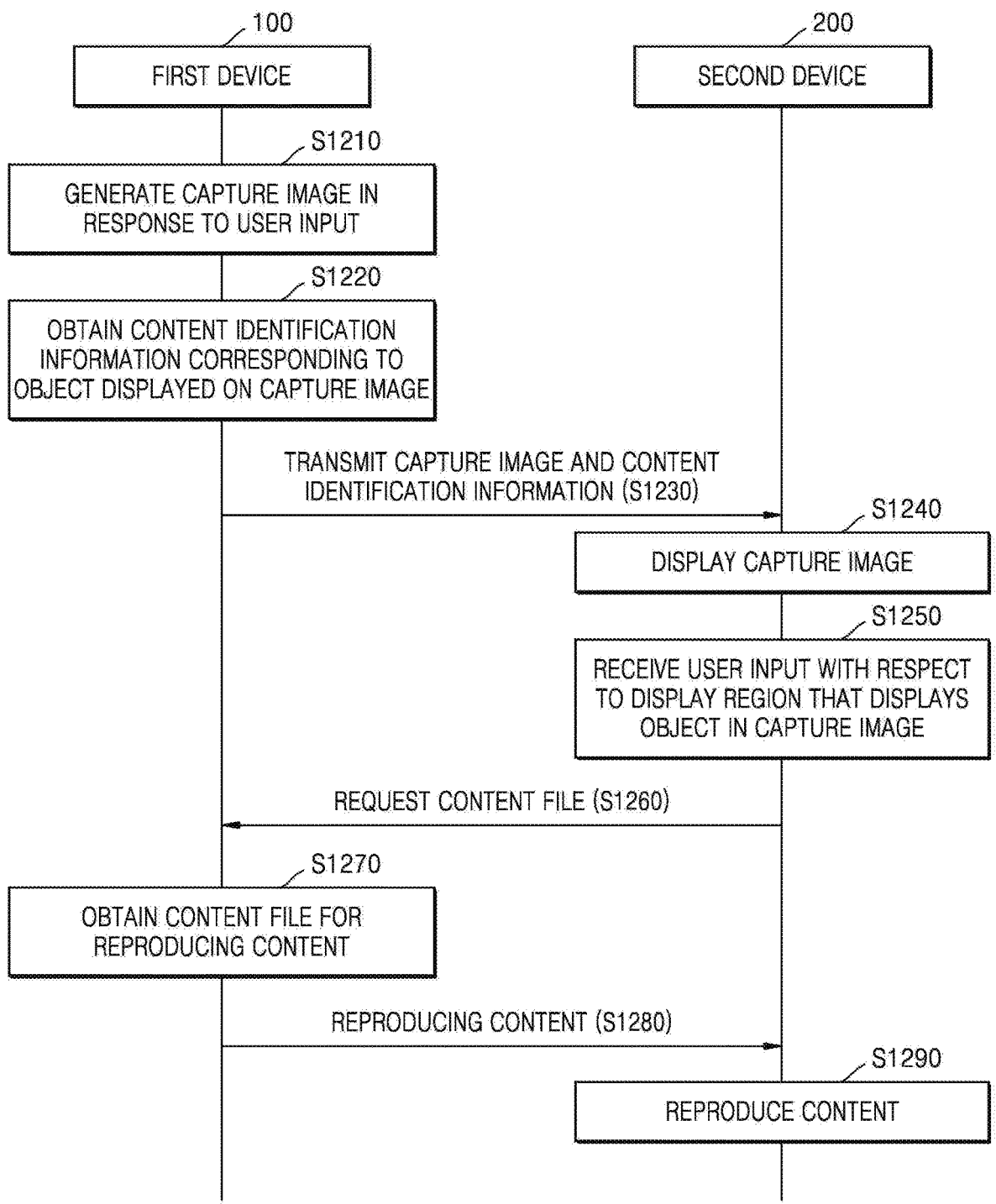
FIG. 12 is a flowchart for explaining an operation method of a content share system.

FIG. 12 is a flowchart for explaining an operation method of a content share system.

Referring to FIG. 12, in operation S1210, the first device 100 may generate a capture image in response to a user input for capturing a screen thereof.

In operation S1220, the first device 100 may obtain content identification information corresponding to an object displayed on the capture image. In this regard, content identification information may include a title of content, a unique number of the content, address information of stored content, etc.

For example, the first device 100 may analyze the capture image to identify objects displayed on the capture image. Also, the first device 100 may obtain identification information of content corresponding to the identified objects.

In operation S1230, the first device 100 may transmit the capture image and the identification information of the content corresponding to the object displayed on the capture image to the second device 200. In this regard, the second device 200 may be an external device that transmits and receives messages to and from the first device 100 through a chatting window of a chatting application.

Also, the first device 100 may generate coordinate information with respect to a predetermined region corresponding to the object in the capture image. The first device 100 may transmit a mapping table including coordinate information of the predetermined region corresponding to the object and content identification information corresponding to the coordinate information to the second device 200.

In operation S1240, the second device 200 may display the capture image received from the first device 100. For example, the second device 200 may display the capture image on the chatting window of the chatting application.

In operation S1250, the second device 200 may receive a user input with respect to a region that displays the object in the capture image. For example, the second device 200 may receive a touch input made by a user's finger, a stylus pen, etc.

In operation S1260, the second device 200 may request the first device 100 to send link information for downloading a content file for reproducing content or the content by using the content identification information corresponding to the region. For example, the second device 200 may request the first device 100 to send the content file by using coordinate information of a region in which the user input is received and the coordinate information and the content identification information of the mapping table.

In operation S1270, the first device 100 may obtain the content file by using the content identification information.

In operation S1280, the first device 100 may transmit the obtained content file to the second device 200.

In operation S1290, the second device 200 may reproduce the content.

Figure 13:
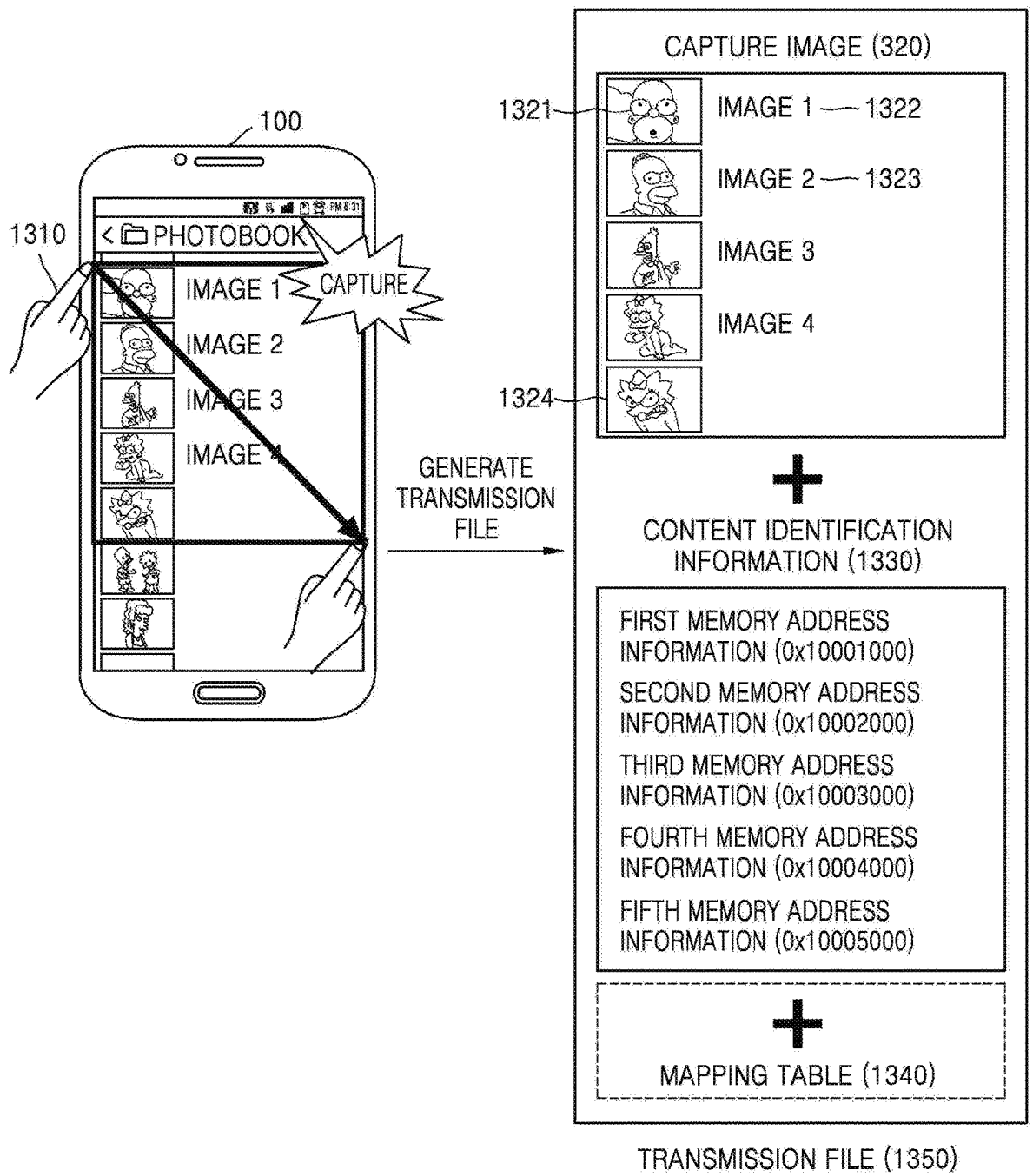
FIG. 13 illustrates an example in which a first device transmits a transmission file including a capture image and content identification information to a second device in a content share system.

FIG. 13 illustrates an example in which the first device 100 transmits a transmission file including a capture image and content identification information to the second device 200 in a content share system.

Referring to FIG. 13, the first device 100 may generate a capture image 1320 since the first device 100 receives a user input 1310 that wholly or partially captures a screen thereof. Also, the first device 100 may obtain content identification information 1330 (i.e. first memory address information to fifth memory address information) of content corresponding to objects 1321, 1322, 1323, 1324, etc. displayed on the capture image 1320.

Also, the first device 100 may generate a transmission file 1350 including the capture image 1320 and the content identification information 1330. Also, the transmission file 1350 may further include a mapping table 1340. As shown in FIG. 14, the mapping table 1340 may include coordinate information 1410 with respect to a predetermined region including at least one object in the capture image 1320 and the content identification information 1330 corresponding to the coordinate information 1410.

Figure 15:
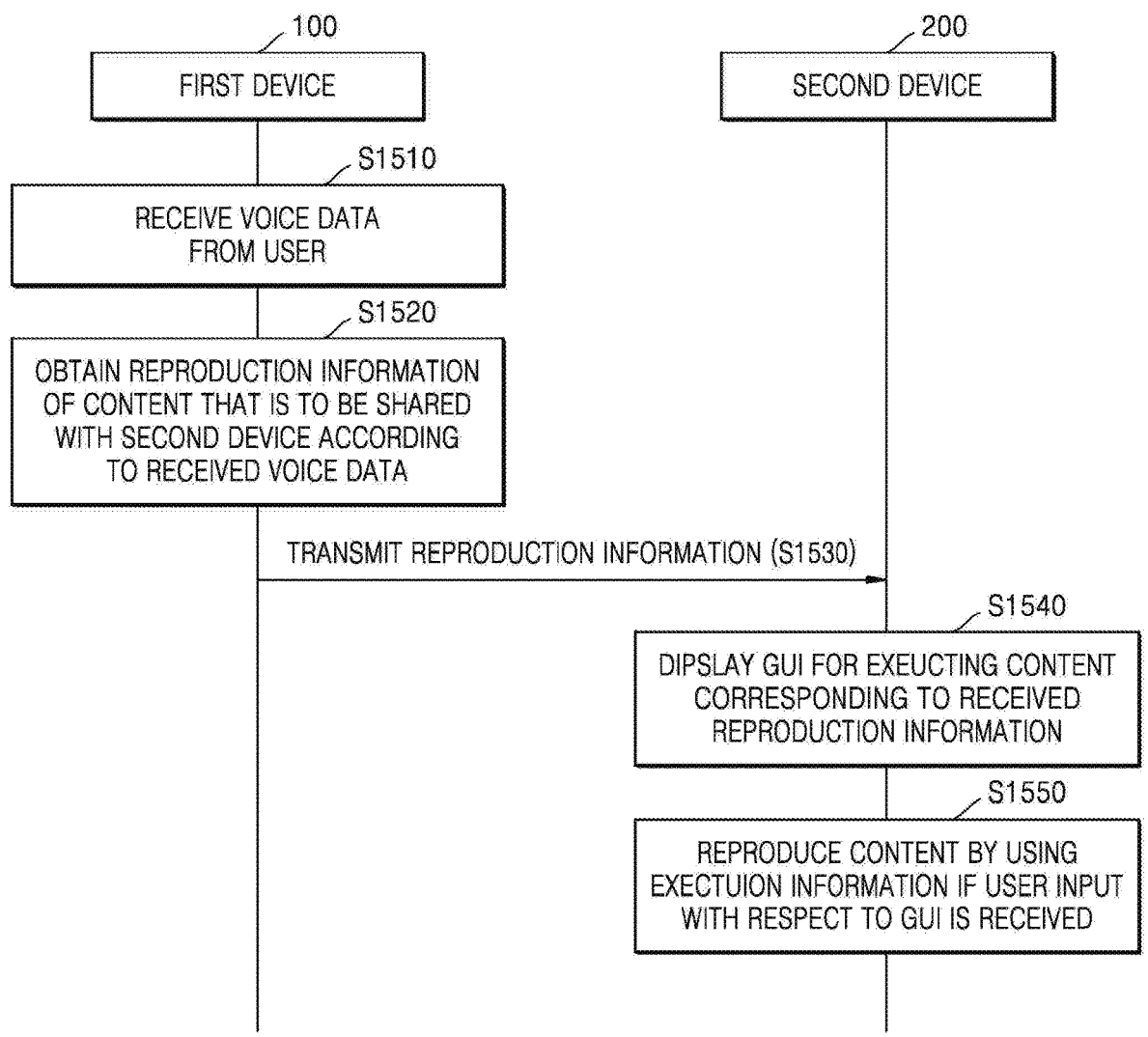
FIG. 15 is a flowchart for explaining a method of sharing content in a share system, according to an embodiment.

FIG. 15 is a flowchart for explaining a method of sharing content in a share system according to an embodiment.

Figure 22:
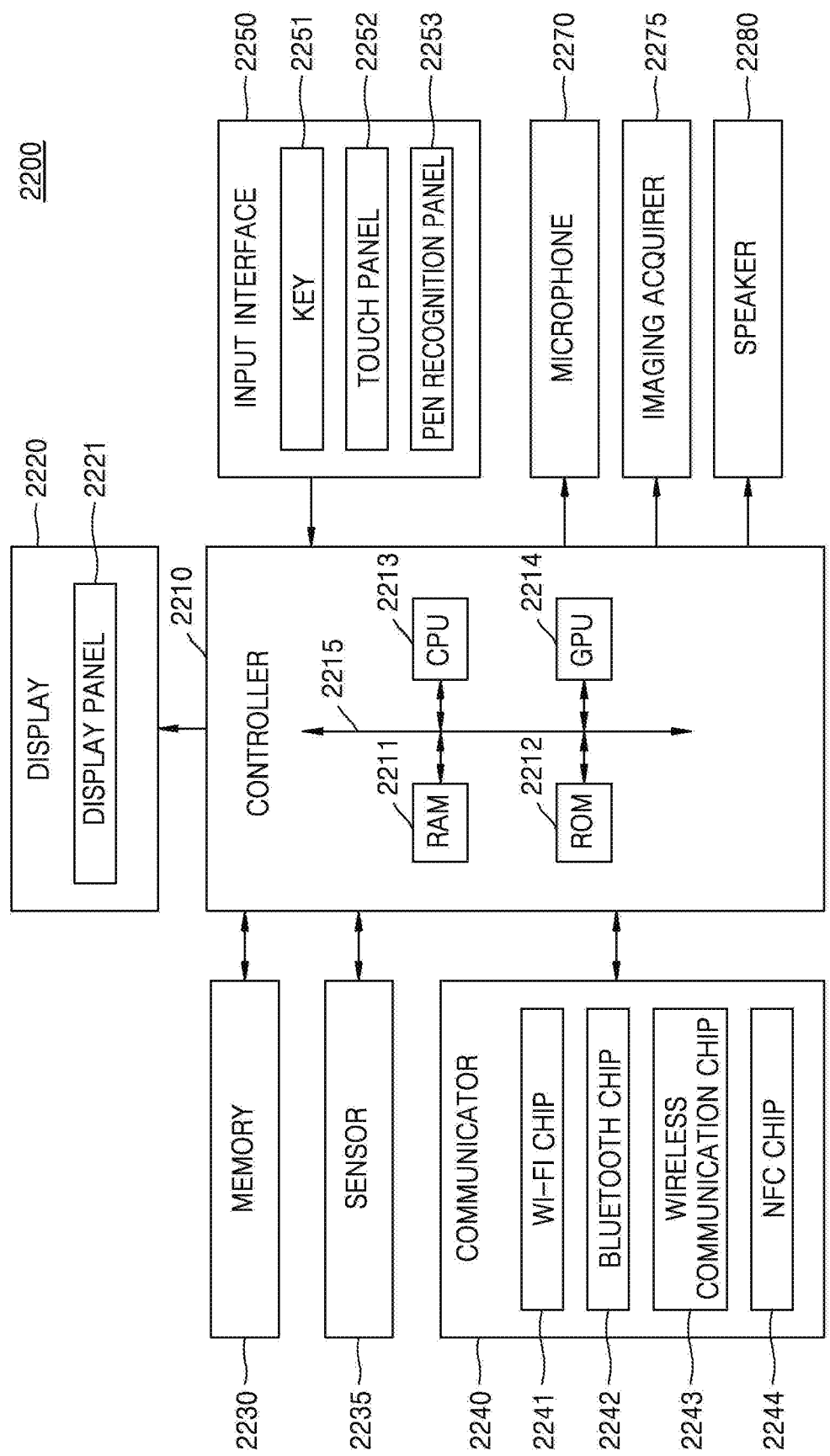
FIG. 22 is a block diagram for explaining a detailed configuration of a device.

Referring to FIG. 15, in operation S1510, the first device 100 may receive voice data from a user. For example, the first device 100 may receive a voice command for sharing specific content with the second device 200 from the user. For example, a chatting application may provide a GUI that receives voice data from the user on a chatting window. The first device 100 may activate a microphone 2270 of FIG. 22 provided in the first device 100 and may receive the voice data through the microphone 2270 in response to a user input with respect the GUI.

In operation S1520, the first device 100 may obtain reproduction information of the content that is to be shared with the second device 200 according to the received voice data. For example, the first device 100 may extract an identification value of the content from the voice data and obtain link information for downloading a content file or content corresponding to the identification value of the content. In this regard, the content may include text data, audio data, video data and/or application reproduction data (for example, binary data) stored in the first device 100 and may be text data, audio data, video data and/or application reproduction data stored in an external server.

Also, the first device 100 may display reproduction information of the content. For example, the first device 100 may display the reproduction information of the content on the chatting window of a chatting application. Thus, a user of the first device 100 may determine whether the first device 100 normally obtains the reproduction information of the content.

In operation S1530, the first device 100 may transmit the reproduction information to the second device 200. For example, if the voice data is completely received, the first device 100 may transmit the reproduction information to the second device 200. Alternatively, the first device 100 may transmit the reproduction information to the second device 200 if receiving a user input to transmit the reproduction information to the second device 200.

In operation S1540, the second device 200 may display the GUI for reproducing content corresponding to the received reproduction information. For example, the second device 200 may display the GUI for reproducing the content on the chatting window of a chatting application.

In operation S1550, if a user input with respect to the GUI is received, the second device 200 may reproduce the content by using the reproduction information. The GUI may include a menu for storing or reproducing content in the second device 200 by using the reproduction information.

Figure 16:
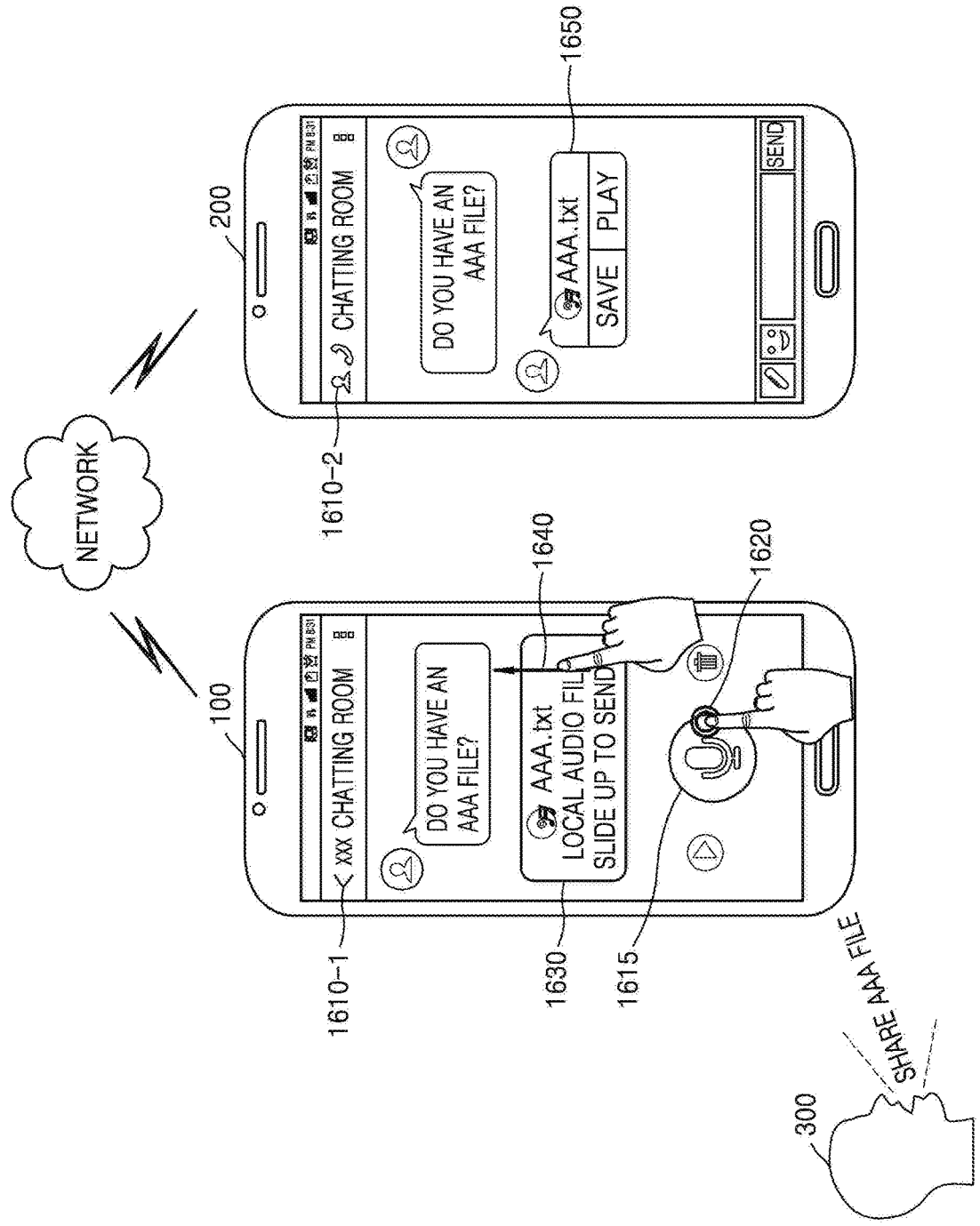
FIG. 16 illustrates an example of sharing reproduction information of content by using voice data.

FIG. 16 illustrates an example of sharing reproduction information of content by using voice data.

Referring to FIG. 16, the first device 100 may receive voice data from a user 300 if a user input 1620 with respect to a GUI 1615 that receives the voice data for sharing content is received in a chatting window 1610-1 of a chatting application. For example, the first device 100 may receive voice data "share an AAA file" from the user 300.

The first device 100 may obtain reproduction information of the content (for example, 'AAA') included in the voice data since the voice data is received. For example, the first device 100 may obtain a content file 1630 with a file name 'AAA'.

The first device 100 may display the obtained content file 1630 on the chatting window 1610-1 thereof. Also, the first device 100 may receive a user input 1640 for sharing the obtained reproduction information 1630 with the second device 200. Accordingly, the first device 100 may transmit the content file (i.e. 'AAA.txt') 1630 to the second device 200.

The second device 200 may provide a GUI 1650 for saving or reproducing content by using the content file 1630 received from the first device 100 in a chatting window 1610-2.

Figure 17:
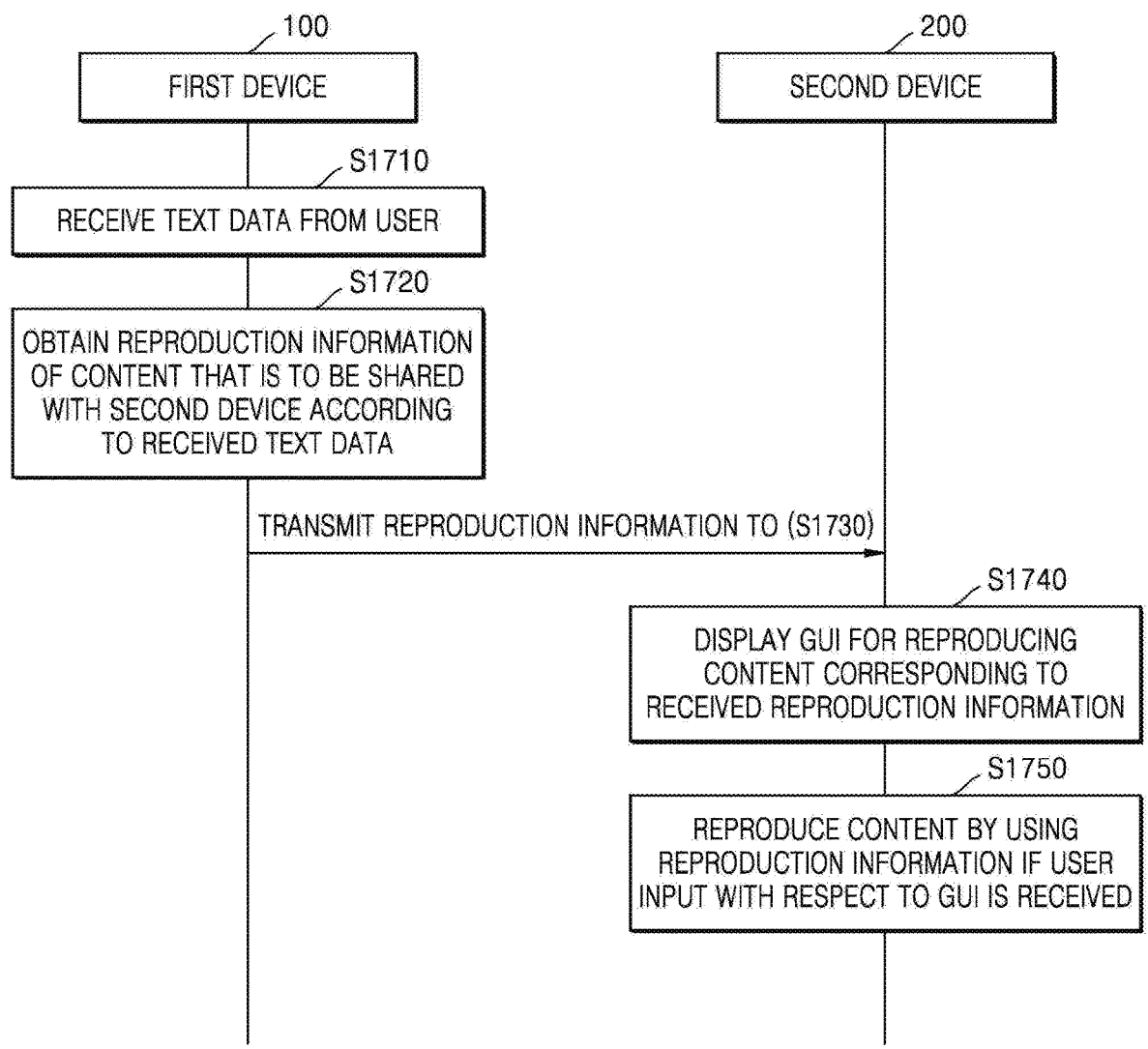
FIG. 17 is a flowchart for explaining a method of sharing content in a share system, according to another embodiment.

FIG. 17 is a flowchart for explaining a method of sharing content in a share system, according to another embodiment.

Referring to FIG. 17, in operation S1710, the first device 100 may receive text data from a user. For example, a chatting application may provide a GUI (for example, a keyboard GUI, etc.) that receives the text data from the user on a chatting window.

In operation S1720, the first device 100 may obtain reproduction information of content that is to be shared with the second device 200 according to the received text data. For example, the first device 100 may extract a content identification value included in the text data and may obtain reproduction information for reproducing the content corresponding to the extracted content identification value. In this regard, the content identification value may include a name of the content file, a content file storage location, a name of a server for downloading the content, a link address for downloading the content, etc. Also, the reproduction information may be, for example, the content file, identification information of the content file, or link information for downloading the content, etc.

Also, the first device 100 may display the obtained reproduction information. For example, the first device 100 may display the obtained reproduction information on the chatting window of the chatting application. Thus, a user of the first device 100 may determine whether the first device 100 has correctly obtained the reproduction information.

In operation S1730, the first device 100 may transmit the reproduction information to the second device 200. For example, the first device 100 may transmit the reproduction information to the second device 200 if the text data is completely received (for example, an input of an enter key, an input of a transmission key, etc.)

In operation S1740, the first device 100 may display a GUI for reproducing content corresponding to the received reproduction information. For example, the second device 200 may display the GUI for saving or reproducing the content on the chatting window of the chatting application.

In operation S1750, the second device 200 may reproduce the content by using the reproduction information if a user input with respect to the GUI is received.

Figure 18:
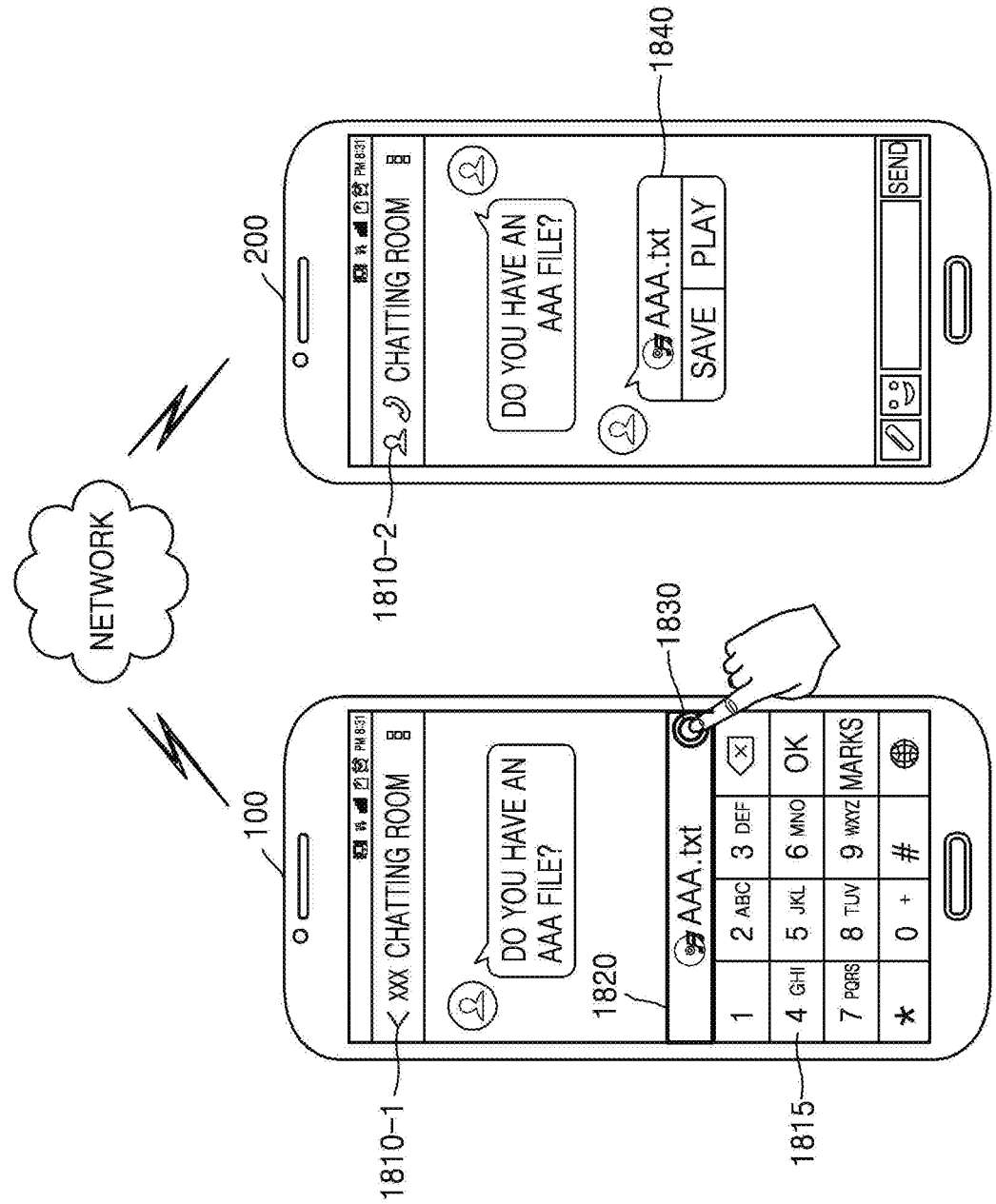
FIG. 18 illustrates an example of sharing reproduction information of content by using text data.

FIG. 18 illustrates an example of sharing reproduction information of content by using text data.

Referring to FIG. 18, the first device 100 may obtain reproduction information for reproducing content corresponding to a content identification value (i.e., 'AAA') included in text data if the text data is received through a user input with respect to a keyboard GUI 1815 provided from a chatting window 1810-1 of a chatting application. For example, the first device 100 may obtain a content file 1820 with a file name 'AAA'.

The first device 100 may display the obtained content file 1820 on a chatting window 1810-1 of the first device 100. Also, the first device 100 may receive a user input 1830 for sharing the obtained content file 1820 with the second device 200. Accordingly, the first device 100 may transmit the content file (i.e. 'AAA.txt') 1820 to the second device 200.

The second device 200 may provide a GUI 1840 for saving or reproducing the content by using the content file 1820 received from the first device 100.

Figure 19:
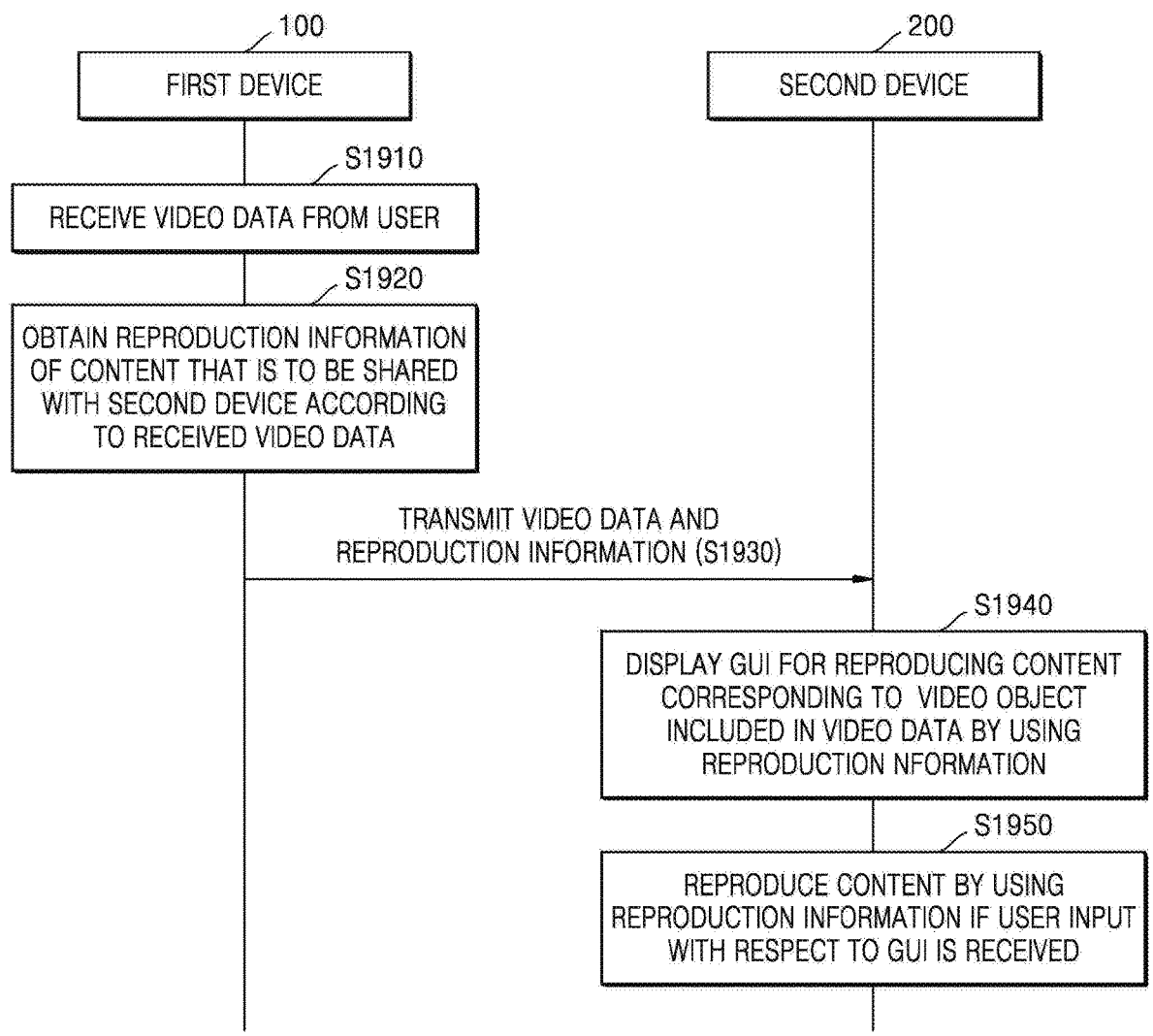
FIG. 19 is a flowchart for explaining a method of sharing content in a share system, according to another embodiment.

FIG. 19 is a flowchart for explaining a method of sharing content in a share system according to another embodiment.

Referring to FIG. 19, in operation S1910, the first device 100 may receive video data from a user. For example, a chatting application may provide a GUI that receives the video data from the user on a chatting window. If a user input with respect to the GUI is received, the first device 100 may activate an imaging acquirer 2275 of FIG. 22 provided in a front or rear surface of the first device 100 and obtain the video data through the imaging acquirer 2275.

In operation S1920, the first device 100 may obtain reproduction information of content that is to be shared with the second device 200 according to the received video data. For example, the first device 100 may extract a content identification value included in the video data and may obtain reproduction information for reproducing the content corresponding to the extracted content identification value. In this regard, the content identification value may include an image, a gesture, an icon, a logo, a text image, etc. that are included in the video data. Also, the reproduction information may be, for example, a content file for reproducing the content, identification information of the content file, or link information for downloading the content, etc.

In operation S1930, the first device 100 may transmit the video data and the reproduction information of the content to the second device 200. Also, the first device 100 may transmit a mapping table including reproduction time information of the content identification value in the video data and coordinate information of a region indicating the content identification value to the second device 200.

Figure 20:
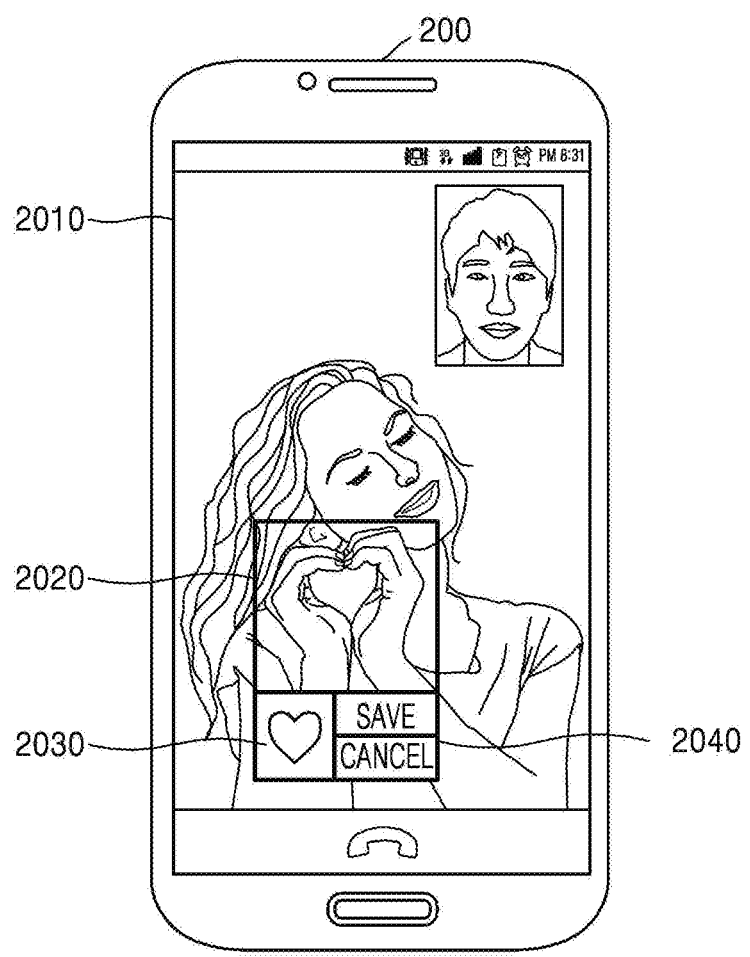
FIG. 20 illustrates an example of sharing reproduction information of content by using video data.

In operation S1940, the second device 200 may display a GUI for saving or reproducing content corresponding to the received reproduction information of the content. Referring to FIG. 20, the second device 200 may display a GUI 2040 for reproducing content (i.e. heart image data) 2030 included in the video data by using the reproduction information received from the first device 100 while reproducing video data 2010. In this regard, the content identification value may be a heart hand shaped gesture 2020.

In operation S1950, the second device 200 may reproduce the content by using the reproduction information if a user input with respect to the GUI is received.

Figure 21:
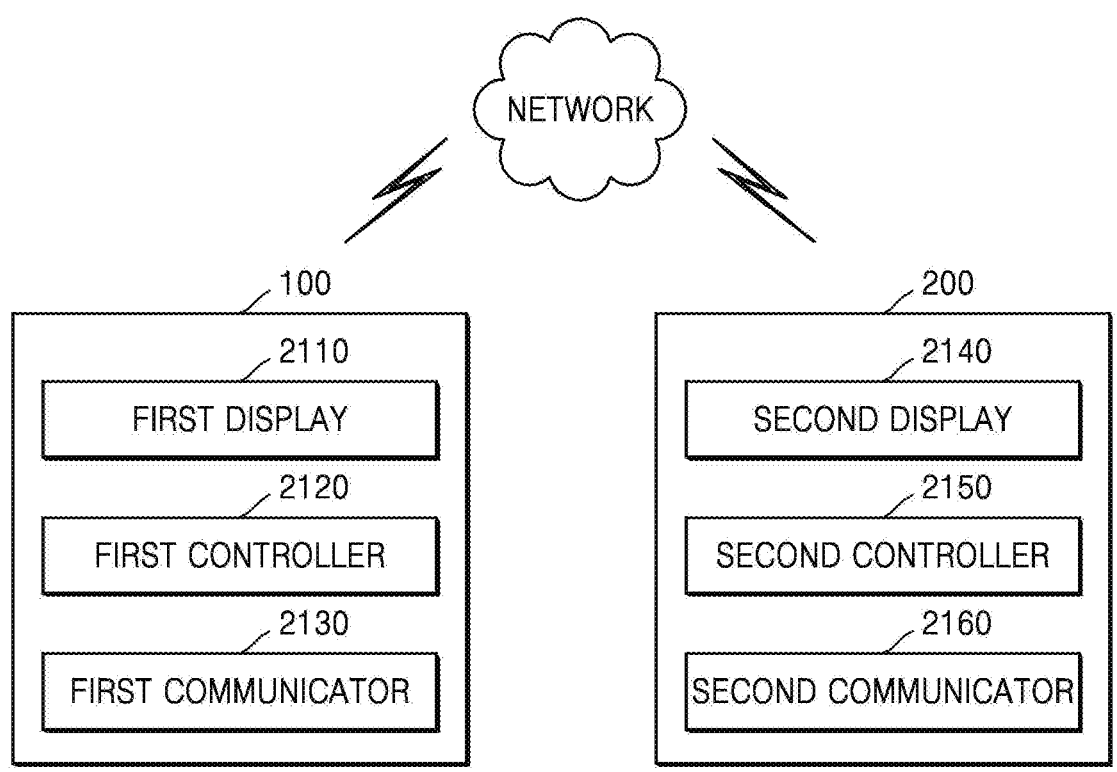
FIG. 21 is a block diagram of configurations of a first device and a second device in a content share system.

FIGS. 21 and 22 are diagrams for explaining the first and second devices 100 and 200 according to embodiments. The first and second devices 100 and 200 of the embodiments provided with reference to FIGS. 1 through 20 will be described with reference to FIGS. 21 and 22 below. Although not specially mentioned, the detailed descriptions and the technical idea provided above apply to the first and second devices 100 and 200 of FIGS. 21 and 22. Thus, redundancies between FIGS. 1 through 20 and FIGS. 21 and 22 will not be repeated here.

FIG. 21 is a block diagram of configurations of the first device 100 and the second device 200 in a content share system.

Referring to FIG. 21, the first device 100 may include a first display 2110, a first controller 2120, and a first communicator 2130.

The first display 2110 may display information processed by the first device 100 on a screen. For example, the first device 100 may display a reproduction screen of an application executed in a foreground therein. For example, the first device 100 may display the reproduction screen of the application executed in the foreground. The first device 100 may display a chatting window of a chatting application and may display a reproduction screen of a photobook application, etc.

The first controller 2120 may control a general operation of the first device 100. For example, the first controller 2120 may control the first display 2110 to display the reproduction screen of the application on the first display 2110.

Also, the first controller 2120 may generate a capture image including objects displayed on the first display 2110 in response to a user input that captures a screen of the first device 100.

Also, the first controller 2120 may obtain reproduction information for reproducing content corresponding to objects displayed on a capture image. In this regard, the content may be text data, audio data, video data and/or application reproduction data (for example, binary data) stored in the first device 100 and may be text data, audio data, video data and/or application reproduction data stored in an external server. Also, an object indicating the content may be an icon representing the content, a text, and/or an image. Also, the reproduction information may be a content file of content corresponding to the object displayed on the capture image, identification information of the content file, or link information for downloading the content.

The first controller 2120 may analyze the capture image to identify the objects included in the capture image. Also, the first controller 2120 may determine whether the identified objects indicate the content. For example, when the object is a text, the first controller 2120 may search for a content file having the same file name as that of the text. In this regard, the first controller 2120 may search for a content file stored in the first device 100 or in an external server. When the content file is present in the first device 100, the first controller 2120 may use the content file as the reproduction information. If the content file is present in the external server, the first controller 2120 may use link information indicating the content file stored in the external server as the reproduction information.

Also, the first controller 2120 may generate coordinate information about an object or an image region corresponding to the reproduction information from the capture image. For example, when an object corresponds to one piece of reproduction information, the first controller 2120 may generate coordinate information about an image region that displays the object from the capture image. Alternatively, when a plurality of objects correspond to the same reproduction information, the first controller 2120 may generate coordinate information about an image region including the plurality of objects from the capture image.

Also, the first controller 2120 may insert an indicator for emphasizing and display the selected object into the capture image in response to a user input that selects some of the objects displayed on the capture image. For example, the first controller 2120 may display the selected object in a bold line or in a specific color. In this case, the first controller 2120 may obtain only reproduction information for reproducing the selected object.

The first communicator 2130 may include one or more components that allows the first device 100 to communicate with the second device 200 or other external devices. For example, the first communicator 2130 may include at least one of a WiFi chip (not shown), a Bluetooth chip (not shown), a wireless communication chip (not shown), and an NFC chip (not shown). The first controller 2120 may transmit and receive data to and from the second device 200 or other external devices by using the first communicator 2130.

The first communicator 2130 may transmit a transmission file including the capture image and the reproduction information to the second device 200 under control of the first controller 2120. For example, the first communicator 2130 may transmit a transmission file with an MHTML file format or an EML file format to the second device 200.

Also, the first communicator 2130 may transmit a mapping table including the coordinate information corresponding to the object displayed on the capture image and the reproduction information corresponding to the coordinate information under control of the first controller 2120. For example, the first communicator 2130 may transmit a transmission file including the capture image and the mapping table to the second device 200 under control of the first controller 2120.

The second device 200 may include a second display 2140, a second controller 2150, and a second communicator 2160.

The second communicator 2160 may include one or more components that allow the second device 200 to communicate with the first device 100 or other external devices. For example, the second communicator 2160 may include at least one of a WiFi chip (not shown), a Bluetooth chip (not shown), a wireless communication chip (not shown), and an NFC chip (not shown).

The second communicator 2160 may receive a transmission file including the capture image and the information for reproducing the content corresponding to the objects displayed on the capture image transmitted by the first device 100. Also, the second communicator 2160 may receive a transmission file including the mapping file in addition to the capture image and the reproduction information.

The second display 2140 may display information processed by the second device 200 on the screen. The second display 2140 may display the capture image received from the first device 100 through the second communicator 2160. For example, the second display 2140 may display the received capture image on the chatting window of the chatting application. In this regard, the capture image may be displayed by emphasizing objects that are selected by a user of the first device 100.

The second controller 2150 may control a general operation of the second device 200. The second controller 2150 may analyze the capture image to identify the object displayed on the capture image. Also, the second controller 2150 may identify an object corresponding to a region in which a user input is received in response to the user input with respect to a region that displays the identified object and may reproduce the content by using reproduction information corresponding to the object.

Alternatively, the second controller 2150 may reproduce the content by using coordinate information of the region that displays the object corresponding to the user input and the coordinate information and the reproduction information of the mapping table. For example, the second controller 2150 may identify coordinate information of the mapping table that matches the coordinate information of the region that displays the object corresponding to the user input and may identify reproduction information corresponding to the coordinate information. The second controller 2150 may reproduce the content by using the identified reproduction information. Also, the second display 2140 may display a reproduction screen of the content.

Alternatively, the second controller 2150 may provide a GUI for storing the content to the second device 200. If a user input with respect to the GUI is received, the second controller 2150 may store the content.

Although operations of the first device 100 and the second device 200 of the content share system are described above, it will be easily understood by one of ordinary skill in the art to the embodiments that the first device 100 and the second device 200 may perform modules and functions of the content share system described above. For example, the second controller 2150 of the second device 200 may generate the capture image and obtain the reproduction information for reproducing the content corresponding to the objects displayed on the capture image.

FIG. 22 is a block diagram for explaining a detailed configuration of a device 2200.

Referring to FIG. 22, the device 2200 corresponding to the first device 100 or the second device 200 may include a memory 2230, a sensor 2235, an input interface 2250, a microphone 2270, the imaging acquirer 2275, and a speaker 2280, in addition to a controller 2210, a display 2220, and a communicator 2240.

The controller 2210 may correspond to the first controller 2120 or the second controller 2150 of FIG. 21. Also, the controller 2210 may generally control the display 2220, the communicator 2240, the sensor 2235, the input interface 2250, the microphone 2270, the imaging acquirer 2275, and the speaker 2280.

The controller 2210 may include at least one of a random access memory (RAM) 2211, a read only memory (ROM) 2212, a CPU 2213, a graphic processing unit (GPU) 2214, and a bus 215. The RAM 2211, the ROM 2212, the CPU 2213, and the GPU 2214 may be connected to each other via the bus 2125. However, the embodiments are not limited thereto. At least one of the RAM 2211, the ROM 2212, and the GPU 2214 may be located outside the controller 2210.

Also, the controller 2210 may be an advanced RISC machine (ARM) processor such as SNAPDRAMON™ of Qualcomm.

The CPU 2213 may access the memory 2230 to perform booting using an OS stored in the memory 2230. The CPU 2213 may perform various operations by using various types of programs, content, data, and the like stored in the memory 2230.

The ROM 2212 may store a set of commands for system booting, etc. For example, if a turn-on command is input and power is supplied to the device 2200, the CPU 2213 may copy the OS stored in the memory 2220 onto the RAM 2211 according to the command stored in the ROM 2212 and boot a system by executing the OS. When the booting is completed, the CPU 2213 may copy various programs stored in the memory 2230 onto the RAM 2211 and perform various operations by executing the programs copied in the RAM 2211. When the booting of the device 2200 is completed, the GPU 2214 may display a UI screen on a region of the display 2220. Also, a screen generated by the GPU 2214 may be provided to the display 2820 and may be displayed on each region of the display 2820.

The display 2820 may correspond to the first display 2110 or the second display 2140 of FIG. 21. Also, the display 2820 may include a display panel 2221 and a controller (not shown) controlling the display panel 2221. The display panel 2221 may be implemented as various types of displays such as a liquid crystal display (LCD), an organic light emitting diode (OLED) display, an active-matrix organic light-emitting diode (AM-OLED) display, and a plasma display panel (PDP). The display panel 2221 may be implemented as a flexible, transparent or wearable panel. The display 2820 may be provided as a touch screen (not shown) in combination with a touch panel 2252 of the input interface 2250. For example, the touch screen (not shown) may include an integrated module in which the display panel 2221 and the touch panel 2252 are coupled to each other in a stack structure. Also, the touch screen may further include a resistive type sensor in a part of the integrated module in which the display panel 2221 and the touch panel 2252 are coupled to each other in the stack structure.

The memory 2230 may include at least one of an internal memory (not shown) and an external memory (not shown).

The internal memory, for example, may include at least one of a volatile memory (for example, a dynamic random access memory (RAM) (DRAM), a static RAM (SRAM), a synchronous DRAM (SDRAM), or the like), a non-volatile memory (for example, a one time programmable read only memory (ROM) (OTPROM), a programmable ROM (PROM), an erasable and programmable ROM (EPROM), an electrically erasable and programmable ROM (EEPROM), a mask ROM, a flash ROM, or the like), a hard disk drive (HDD), and a solid state drive (SSD).

According to an embodiment, the controller 2210 may load a command or data received from at least one of a non-volatile memory or other elements to a volatile memory to process the loaded command or data. Also, the controller 2210 may save data received or generated from other elements in the non-volatile memory.

The external memory, for example, may include at least one of a CompactFlash (CF), Secure Digital (SD), Micro Secure Digital (Micro-SD), Mini Secure Digital (Mini-SD), extreme Digital (xD), and a Memory Stick.

Also, the memory 2230 may store a content file, etc. For example, the memory 2230 may store various types of application reproduction data, audio data, video data, image data, and text data for use in the operation of the device 2200.

The communicator 2240 may correspond to the first communicator 2130 or the second communicator 2160 of FIG. 21. The communicator 2240 may include at least one of a Wireless Fidelity (Wi-Fi) chip 2241, a Bluetooth chip 2242, a wireless communication chip 2243, and a NFC chip 2244. The controller 2210 may transmit and receive data to and from an external device using the communicator 2240.

The Wi-Fi chip 2241 and the Bluetooth chip 2242 may perform communication using a Wi-Fi scheme and a Bluetooth scheme, respectively. When the Wi-Fi chip 2241 and the Bluetooth chip 2242 is used, the communicator 22240 may transmit and receive various types of information after transmitting and receiving various types of connection information such as a service set identifier (SSID) and a session key and connecting communication using the connection information.

The wireless communication chip 2243 is a chip for performing communication according to various communication standards such as Institute of Electrical and Electronics Engineers (IEEE), Zigbee, $3^{rd}$ Generation (3G), 3rd Generation Partnership Project (3GPP), and Long Term Evolution (LTE). The NFC chip 2244 is a chip operating in an NFC scheme using a band of about 13.56 MHz among various radio frequency identification (RFID) frequency bands such as about 135 kHz, 13.56 MHz, 433 MHz, 860 to 960 MHz, and 2.45 GHz.

The input interface 2250 may receive various commands from a user. The input interface 2250 may include at least one of a key 2251, the touch panel 2252, and the pen recognition panel 2253.

The touch panel 2252 may detect the user's touch input and output a touch event value corresponding to a detected touch signal. According to an embodiment, the touch panel 2252 may receive a touch input including at least one of a tap of the user, a touch and hold, a double tap, panning, flick, and drag and drop. When the touch panel 2252 constitutes a touch screen (not shown) in combination with the display panel 2221, the touch screen may be implemented as various types of touch sensors such as capacitive, resistive, and piezoelectric sensors.

The capacitive sensor calculates touch coordinates by detecting micro electricity excited by a user's body when part of the user's body touches the surface of the touch screen by using a dielectric coated on the surface of the touch screen. The resistive sensor includes two electrode plates embedded in the touch screen, and detects that an electric current flows due to the contact between the upper and lower plates of the touched point to calculate touch coordinates when the user touches the screen. Although a touch event may be mainly generated by a human finger in the touch screen, the touch event may also be generated by a conductive material capable of giving a change in electrostatic capacitance.

The key 2251 may include various types of keys such as a mechanical button and a wheel formed in various regions such as front, side, and rear surface portions of the exterior of the main body of the device 2200.

The pen recognition panel 2253 may detect a proximity input or a touch input of a pen according to an operation of a touch pen (for example, a stylus pen or a digitizer pen) of the user and output the detected pen proximity event or pen touch event. The pen recognition panel 2253, for example, may be implemented in an electron magnetic resonance (EMR) method, and detect a touch or a proximity input according to a change in the intensity of an electromagnetic field by the proximity or touch of the pen. In detail, the pen recognition panel 2253 may be configured to include an electronic induction coil sensor (not shown) having a grid structure and an electronic signal processor (not shown) for sequentially providing an alternating current (AC) signal having a predetermined frequency to each loop coil of the electronic induction coil sensor. When there is a pen including a built-in resonant circuit in the vicinity of a loop coil of the pen recognition panel 2253, a magnetic field transmitted from the corresponding loop coil generates an electric current based on the mutual electromagnetic induction in the resonant circuit within the pen. Based on the electric current, an inductive magnetic field is generated from a coil constituting the resonant circuit of the pen, and the pen recognition panel 2253 may detect the inductive magnetic field from a loop coil which is in the state of receiving a signal to detect a proximity position or a touch position of the pen. The pen recognition panel 2253 may be provided to have a given area in the lower portion of the display panel 2221, for example, an area capable of covering a display region of the display panel 2221.

The microphone 2270 may receive the user's voice or another sound and convert the received voice or sound into audio data. The controller 2210 may use the user's voice input through the microphone 2270 in a call operation or convert the voice into audio data so that the audio data may be stored in the memory 2230.

The imaging acquirer 2275 may image a still image or a moving image according to control of the user. The imaging acquirer 2275 may be implemented in plural like front and rear surface cameras.

When the imaging acquirer 2275 and the microphone 2270 are provided, the controller 2210 may perform a control operation according to the user's voice input through the microphone 2270 or the user's motion recognized by the imaging acquirer 2550. For example, the device 2200 may operate in a motion control mode or a voice control mode. When the device 2200 operates in the motion control mode, the controller 2210 may image the user by activating the imaging acquirer 2275 and track a change in the user's motion to perform a control operation corresponding to the tracked change. When the device 2200 operates in the voice control mode, the controller 2210 may operate in a voice recognition mode in which the user's voice input through the microphone 2270 is analyzed and the control operation is performed according to the analyzed user voice.

The speaker 2280 may output audio data under control of the controller 2210. According to some embodiments, if a user input that selects an application from an application list is received through the input interface 2250, the speaker 2280 may output notification sound identified according to power consumption levels of the selected application.

In addition, although not shown in FIG. 22, the device 2200 may further include a Universal Serial Bus (USB) port to be connected with a USB connector, various external input ports to be connected to various external ports such as a headset, a mouse, a LAN, etc., and a Digital Multimedia Broadcasting (DMB) chip to receive and process a DMB signal, various sensors, etc.

Also, the device 2200 may further include a vibrator (not shown) for vibrating the device 2200. According to some embodiments, if a user input that selects an application from an application list is received through the input interface 2250, the device 2200 may further include a vibrator (not shown) that outputs vibration identified according to power consumption levels of the selected application.

The names of the above-described elements of the device 2200 may differ.

The embodiments can be written as computer programs and can be implemented in general-use digital computers that reproduce the programs using a computer readable recording medium.

When it is necessary for a processor of the computer to communicate with any other remote computer, a remote server, or the like so as to perform the aforementioned functions, the processor of the computer may further include information regarding how to communicate with the other remote computer, the remote server, or the like by using a communication module (e.g., wired and/or wireless communication modules) of the computer, information regarding which information or media has to be exchanged during the communication, or the like.

Also, functional programs, code, and code segments for accomplishing the embodiments can be easily construed or changed by programmers skilled in the art to which the embodiments pertain, by taking into account a system environment of a computer that executes programs by reading a recording medium.

Examples of the computer-readable recording medium include ROM, RAM, CD-ROM, magnetic tapes, floppy disks, optical media storages, etc.

The recording medium that is readable by the computers having recorded thereon the programs can also be distributed over network coupled computer systems so that the computer readable code is stored and executed in a distributed fashion. In this case, at least one of the distributed computers may perform some functions of the aforementioned functions and may transmit results thereof to at least one of the distributed computers, and the computer having received the results may perform some functions of the aforementioned functions and may also provide results thereof to other distributed computers.

It will be apparent that all elements of the one or more embodiments are not limited to be combined or to operate as one combination. That is, all elements may be selectively combined and may operate as one within the scope of the present disclosure.

In addition, all elements may be each implemented as independent hardware, or some or all of the elements may be selectively combined to operate as a computer program having a program module that performs some or all of combined functions in hardware or a plurality of pieces of hardware. Codes and code segments for configuring the computer program can be easily construed by one of ordinary skill in the art to which the embodiments pertain. The computer program may implement the embodiments of the present specification by being stored in a non-transitory computer-readable recording medium and being read and executed by a computer. Examples of the non-transitory computer-readable recording medium include magnetic recording media, optical recording media, or the like.

While this disclosure has been particularly shown and described with reference to the embodiments thereof, it will be understood by one of ordinary skill in the art that various changes in form and details may be made therein without departing from the spirit and scope of the disclosure as defined by the appended claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The invention claimed is:

1. A method of sharing content performed by an apparatus, the method comprising:
receiving, from another apparatus, a capture image of a screen of the other apparatus and reproduction information for reproducing a first content corresponding to a first object and a second content corresponding to a second object, wherein the first object and the second object are selected by a user of the other apparatus from a plurality of objects displayed in the capture image;
displaying the capture image including a visually emphasized portion corresponding to first at least one object including the selected first object and second at least one object including the selected second object among the plurality of objects, wherein each of an object included in the first at least one object corresponds to the first content and each of an object included in the second at least one object corresponds to the second content;
receiving, from the other apparatus, a mapping table comprising coordinate information of the visually emphasized portion in the capture image and the reproduction information corresponding to the coordinate information;
identifying reproduction information corresponding to coordinate information of the region corresponding to the visually emphasized portion based on the received mapping table; and
reproducing a-at least one of the first content or the second content by using the reproduction information, based on an input in a region corresponding to the visually emphasized portion,
wherein the visually emphasized portion of the capture image comprises a first visually emphasized portion corresponding to the first at least one object and a second visually emphasized portion corresponding to the second at least one object, and
wherein the first visually emphasized portion indicates that the first at least one object corresponds to the first content and the second visually emphasized portion indicates that the second at least one object corresponds to the second content, and
wherein the reproducing comprises using the identified reproduction information.

2. The method of claim 1,
wherein the other apparatus transmits and receives a message to and from the apparatus by using a chatting application, and
wherein the capture image is displayed in a chatting window of the chatting application.

3. The method of claim 1, wherein the reproducing of the at least one of the first content or the second content comprises:
requesting the other apparatus to send the content by using the reproduction information based on the input in the region corresponding to the visually emphasized portion; and
receiving the at least one of the first content or the second content from the other apparatus.

4. The method of claim 1, wherein the reproduction information is at least one of a content file, identification information of the content file, or link information for downloading the content.

5. The method of claim 1,
wherein the visually emphasized portion in the capture image is displayed in a bold outline or in a specific color.

6. An apparatus comprising:
a display; and
at least one processor configured to:
receive, from another apparatus, a capture image of a screen of the other apparatus, reproduction information for reproducing a first content corresponding to a first object and a second content corresponding to a second object, and a mapping table comprising coordinate information of the visually emphasized portion in the capture image and the reproduction information corresponding to the coordinate information, wherein the first object and the second object are selected by a user of the other apparatus from among a plurality of objects displayed in the capture image,
control the display to display the capture image including the visually emphasized portion corresponding to first at least one object including the selected first object and second at least one object including the selected second object among the plurality of objects, wherein each of an object included in the first at least one object corresponds to the first content and each of an object included in the second at least one object corresponds to the second content,
identifying reproduction information corresponding to coordinate information of the region corresponding to the visually emphasized portion based on the received mapping table, and
reproduce at least one of the first content or the second content by using the reproduction information based on an input in a region corresponding the visually emphasized portion,
wherein the visually emphasized portion of the capture image comprises a first visually emphasized portion corresponding to the first at least one object and a second visually emphasized portion corresponding to the second at least one object,
wherein the first visually emphasized portion indicates that the first at least one object corresponds to the first content and the second visually emphasized portion indicates that the second at least one object corresponds to the second content, and
wherein the reproducing comprises using the identified reproduction information.

7. The apparatus of claim 6, wherein the at least one processor is further configured to request the other apparatus to send the content by using the reproduction information based on the input in the region corresponding to the visually emphasized portion and receive the at least one of the first content or the second content from the other apparatus.

8. The apparatus of claim 6,
wherein the visually emphasized portion in the capture image is displayed in a bold outline or in a specific color.

9. The method of claim 1, further comprising reproducing the content only based on the user input being in the region.

* * * * *